United States Patent [19]

Saeki et al.

[11] Patent Number: 4,794,643

[45] Date of Patent: Dec. 27, 1988

[54] METHOD FOR DEVELOPING A KEY SIGNAL FOR DESCRAMBLING IN TELEVISION BROADCASTING

[75] Inventors: Yoshifumi Saeki; Shigeru Watanabe; Ryuichi Todoroki, all of Tokyo, Japan

[73] Assignee: Pioneer Electronic Corporation, Tokyo, Japan

[21] Appl. No.: 509,509

[22] Filed: Jun. 30, 1983

[30] Foreign Application Priority Data

Jun. 30, 1982 [JP] Japan .................... 57-112739

[51] Int. Cl.<sup>4</sup> ............................ H04N 7/67
[52] U.S. Cl. ............................ 380/15; 380/20; 380/21; 380/33; 380/34; 380/45; 380/47
[58] Field of Search .............. 380/15, 20, 21, 45, 380/47, 33, 34

[56] References Cited

U.S. PATENT DOCUMENTS 2,603,714 7/1952 Meacham .................... 380/34
4,319,273 3/1982 Nossem .................... 380/15

Primary Examiner—Stephen C. Buczinski
Attorney, Agent, or Firm—Sughrue, Mion, Zinn, Macpeak, and Seas

[57] ABSTRACT

A scrambling method for TV pictures avoids deterioration of the reproduced picture by level compressing only selected horizontal flyback portions according to a randomly selected pattern to prevent synchronization at the receiver. Key signals are added repetitively to a plurality of horizontal synch signals in one frame so as to enable descrambling of the picture at the decoder, even if noise or data error interferes with one or more of the signals.

11 Claims, 19 Drawing Sheets

BEFORE SCRAMBLING

AFTER SCRAMBLING

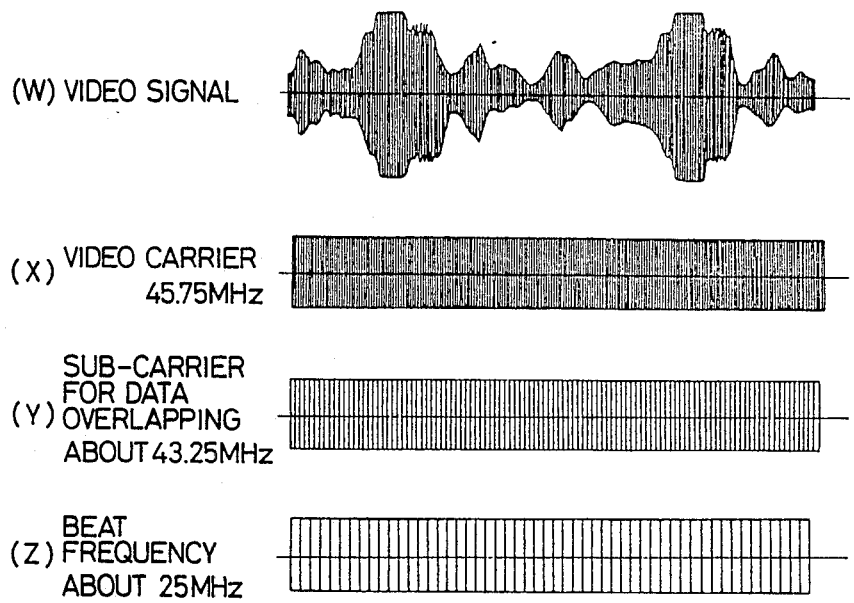

FIG. 10

(W) VIDEO SIGNAL (X) VIDEO CARRIER 45.75MHz (Y) SUB-CARRIER FOR DATA OVERLAPPING ABOUT 43.25MHz (Z) BEAT FREQUENCY ABOUT 25MHz

FIG. 13

| | | | | | | |
|---|---|---|---|---|---|---|
| 16L | $S_1$ | $K_1$ | $K_2$ | $K_3$ | $K_4$ | $P_1$ |
| 17L | $S_2$ | $K_5$ | $K_6$ | $K_7$ | $K_8$ | $P_2$ |
| 18L | $S_3$ | $K_9$ | $K_{10}$ | $K_{11}$ | $K_{12}$ | $P_3$ |
| 19L | $S_4$ | $K_{13}$ | $K_{14}$ | $K_{15}$ | $K_{16}$ | $P_4$ |
| 20L | $S_5$ | $K_{17}$ | $K_{18}$ | $K_{19}$ | $K_{20}$ | $P_5$ |
| 21L | $S_6$ | $K_{21}$ | $K_{22}$ | $K_{23}$ | $K_{24}$ | $P_6$ |
| 22L | $S_7$ | $K_{25}$ | $K_{26}$ | $K_{27}$ | $K_{28}$ | $P_7$ |
| 23L | $S_8$ | $K_{29}$ | $K_{30}$ | $K_{31}$ | $K_{32}$ | $P_8$ |
| 24L | $S_9$ | $K_{33}$ | $K_{34}$ | $K_{35}$ | $K_{36}$ | $P_9$ |
| 25L | $S_{10}$ | $K_{37}$ | $K_{38}$ | $K_{39}$ | $K_{40}$ | $P_{10}$ |
| 26L | $S_{11}$ | $B_1$ | $B_2$ | $B_3$ | $B_4$ | $P_{11}$ |
| 27L | $S_{12}$ | $B_5$ | $B_6$ | $B_7$ | $B_8$ | $P_{12}$ | nth, n+1th, n+2th, n+3th, n+4th, BLOCK CHECK

FIG. 18

| | | | | | | |
|---|---|---|---|---|---|---|
| 16L | $K_1$ | $K_2$ | $K_3$ | $K_4$ | $P_1$ | } nth |
| 17L | $K_5$ | $K_6$ | $K_7$ | $K_8$ | $P_2$ | |
| 18L | $K_9$ | $K_{10}$ | $K_{11}$ | $K_{12}$ | $P_3$ | } n+1th |
| 19L | $K_{13}$ | $K_{14}$ | $K_{15}$ | $K_{16}$ | $P_4$ | |
| 20L | $K_{17}$ | $K_{18}$ | $K_{19}$ | $K_{20}$ | $P_5$ | } n+2th |
| 21L | $K_{21}$ | $K_{22}$ | $K_{23}$ | $K_{24}$ | $P_6$ | |
| 22L | $K_{25}$ | $K_{26}$ | $K_{27}$ | $K_{28}$ | $P_7$ | } n+3th |
| 23L | $K_{29}$ | $K_{30}$ | $K_{31}$ | $K_{32}$ | $P_8$ | |
| 24L | $K_{33}$ | $K_{34}$ | $K_{35}$ | $K_{36}$ | $P_9$ | } n+4th |
| 25L | $K_{37}$ | $K_{38}$ | $K_{39}$ | $K_{40}$ | $P_{10}$ | |
| 26L | $B_1$ | $B_2$ | $B_3$ | $B_4$ | $P_{11}$ | } BLOCK CHECK |
| 27L | $B_5$ | $B_6$ | $B_7$ | $B_8$ | $P_{12}$ | |

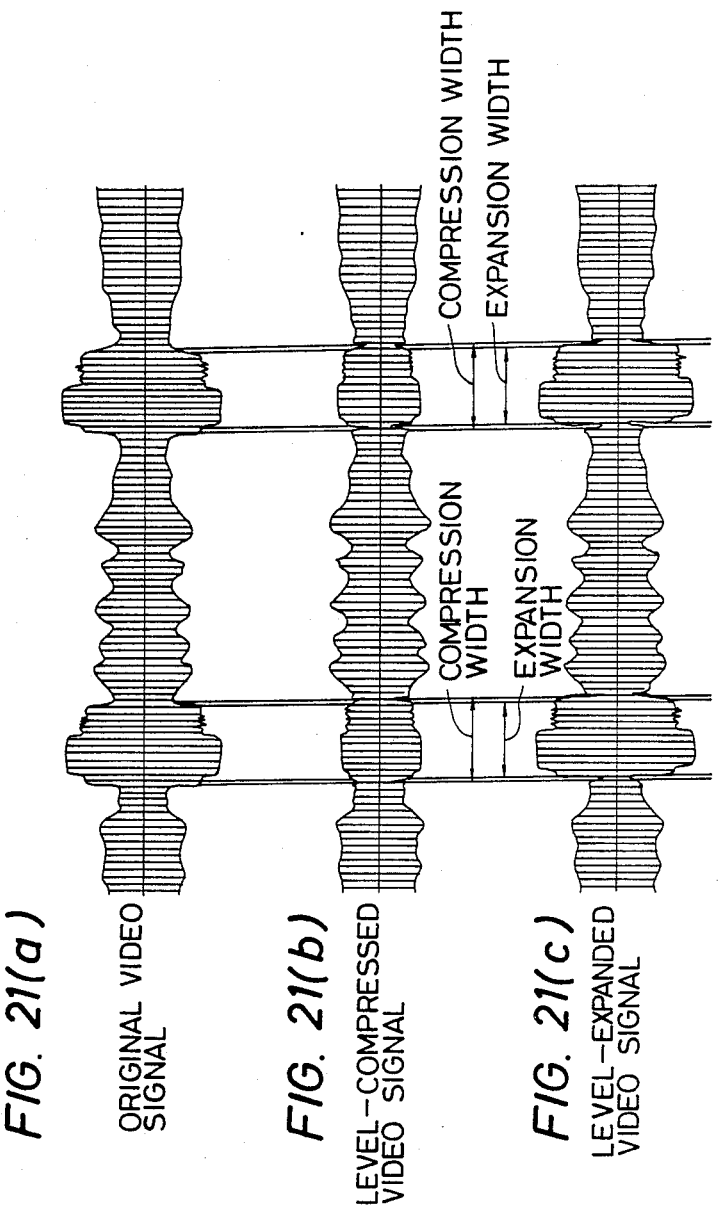

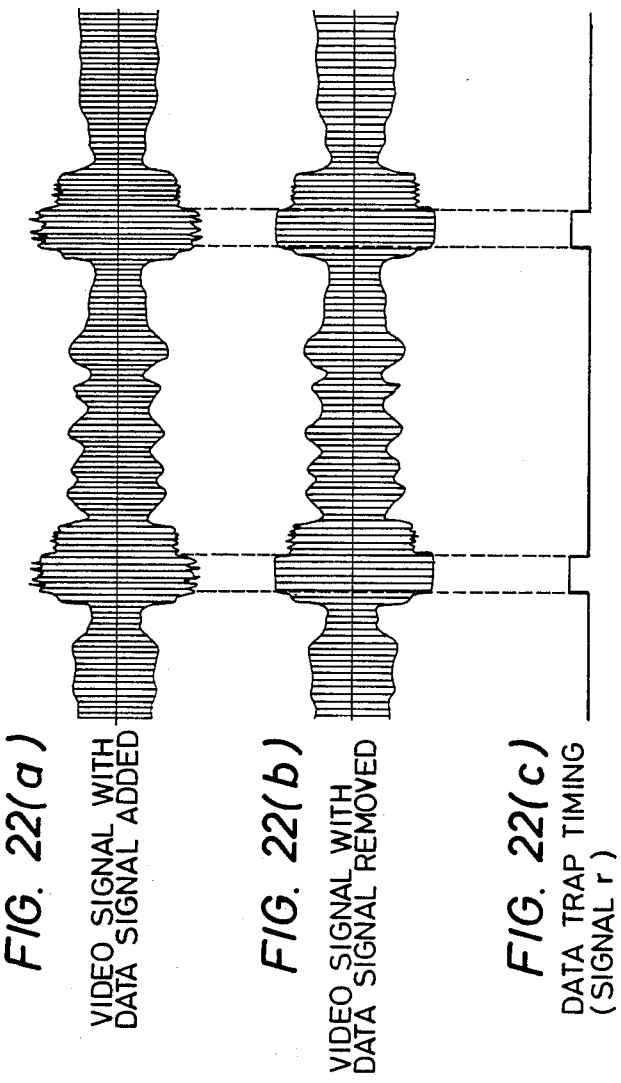

METHOD FOR DEVELOPING A KEY SIGNAL FOR DESCRAMBLING IN TELEVISION BROADCASTING

BACKGROUND OF THE INVENTION

In television broadcasting (including wireless broadcasting and cable broadcasting) a television video signal may be scrambled at the program broadcasting side and processed so as to be sent out in such a way that the picture may not be normally be received as sent. The video signal must be restored to a normal state by a key signal at the picture receiving side, so that the program may be viewed and heard. The present invention relates to a method for developing a key signal for descrambling television broadcasting in which the key signal for restoring the picture is added a plurality of times to one field so as to protect the key signal from external disturbances such as data error, noise and the like, thereby making it possible to completely effect descrambling.

In conventional TV broadcasting services, either by wireless or cable, programs can be watched on normal, standard TV sets, within respective area covered by service networks, by reproducing TV pictures as received. However, it is necessary to make it possible to view TV programs only on TV sets owned by specific subscribers, but not by others with respect to paid TV broadcasting services. Particularly, in CATV broadcasting services capable of providing various programs, the operation of such CATV stations is dependent on the fees paid for programs, so that the segregation of subscribers is essential. For that reason, transmitters of programs require a scrambling method which manipulates the pictures transmitted so that they cannot be reproduced as normal pictures if received as they are.

Firstly, a CATV system will be outlined hereunder with reference to FIG. 1.

This system has a unique chargeable program broadcasting function.

FIG. 1 shows the entire CATV system. This system comprises a center 1 and thousands and thousands of terminal equipment units 28 connected therewith by means of coaxial cables. From the center 1 is laid a trunk line cable 3 on which are installed at predetermined points a trunk line amplifier 4 and a branch box, respectively. From this branch box 5 are drawn a plurality of branch cables 6, each having a branch amplifier 7 and a tapoff 8, respectively. From each tapoff 8 are drawn plurality of sub-branch cables 9; each terminal thereof is drawn into a household 2. The terminal equipment 28 in each household 2 comprises a main box 10, a TV set 11 and a control box 12. The terminal of a sub-branch cable 9 is connected to the main box 10, the TV set 11 and the control box 12. That is, the center 1 and every terminal unit 28 in subdivisioned households are inter-connected in a Christmas tree manner.

Outside the aforementioned center 1 is erected a receiving antenna 13, and this is connected to a demodulator in a source group 14. In this source group are a video-disc player 16, video-tape recorder 17, studio 18 and so forth. A modulation transmitting part 19 that receives signals from the source group 14 comprises two systems: one consists of an IF modulator circuit 20, a scrambling circuit 21 and an up converter circuit 11; and the other, an IF modulator circuit 23 and an up converter circuit 24. Respective outputs from the up converter circuits 22 and 24 are connected to the trunk line cable 3. The trunk line cable 3 is also connected to a data transmitter/receiver set 25 that communicates with each main box 10. To the data transmitter/receiver set 25 is connected a computer 26 to which is connected perpheral equipment 27 including a printer, display, etc.

The operation of this CATV system will now be described; turning ON the TV set 11 and operating the control box 12 to select a desired channel enables pictures to be supplied to the TV set 11 through conversion, by means of the main box 10, of a frequency for said channel into that for an idle channel. Types of channels selectable selectable by means of the control box 12 comprise:

(A) retransmissions for receiving programs as they are;
(B) self-sustained programs (free of charge); and
(C) chargeable programs.

Each group has several channels, respectively, thus making a total of some 20-30 or more selections available.

(A) Retransmission

Electromagnetic waves received by the receiving antenna 13 are demodulated by means of the demodulator 15 and delivered to the modulation transmitting Section 19. The signals is then modulated in the IF modulator circuit 23 and the modulated signal is raised to a specific frequency in the up converter circuit 24. This signal, having been modulated and positioned to a specific channel, is transmitted by way of the trunk line cable 3, branch cables 6 and the sub-branch cables 9 to the households 2 and is received by the TV sets 11 through the medium of the terminal equipment 28.

(B) Self-sustained Programs:

These programs include weather forecasts, newswires, stock quotations and the like. Recorded programs regenerated by the video-disc player 16 or the video-tape recorder 17 and live programs produced in the studio 18 are transmitted to the trunk line cable 3 upon being modulated and subsequently converted into a frequency for a specific channel in the IF modulator circuit 13 and the up converter 24, respectively. These programs are free of charge regardless of the number of times of reception or hours thereof, and each household may receive these programs upon monthly payment of a base fee.

(C) Chargeable Programs

These programs include newly produced motion pictures and other specific programs. Recorded programs are regenerated on the video-disc player 16 or the video-tape recorder 17, and live programs produced in the studio 18 are modulated in the IF modulator circuit 20, followed by adding to the videosignal a specific synchronizing signal in the scrambling circuit 21, to manipulated the picture signals so that they will not appear as normal pictures upon reception of the same as they are. The frequency of the signal is then raised in the up converter circuit 22 to that for a specific channel and the signal is then sent to the trunk line cable 3. Each household 2 desiring to watch this chargeable program may be able to do so by demodulating the received signals into normal video signals in the main box 10. For reception of chargeable programs, the fees are calculated on a pre-established basis and are added to the monthly base fee on a bill.

The aforementioned center 1 and the terminal equipment 28 of every household 2 are connected by means of coaxial cables, but unless the reception of pictures on certain channels by households 2 is periodically verified, the fair operation of a CATV system cannot be expected because, if not, discrimination between chargeable and free of charge accounts based on programs received is not feasible. For this purpose the data transmitter/receiver set 25 is provided determine the signals being received during a retrieval time (so-called polling) by transmitting a retrieval signal at a certain time interval, calling main boxes 10 in every terminal unit 28 using a unique address number assigned to each main box 10. Each main box 10, in response to the polling signal, generates an answer as to the channel through which pictures are being received, and transmits it back to the data transmitter/receiver set 25. The data received by the data transmitter/receiver set 25 are put through data processing by the computer 26 and are displayed on or printed out by the perpheral equipment 27. Polling is carried out at a certain time interval (several-tens of seconds), thus making it possible to sum ratings, etc. at once. Some programs invite participation by the audience; in which the audience may be able to answer, while watching on the TV sets 11, the question asked in the program by operating the control box 12. The answers (data) are sent to the center 1 through the coaxial cables.

For certain programs in conventional TV broadcasting, video signals transmitted from the center 1 are scrambled (privacy transfer). In order to receive these scrambled pictures as normal, a descrambling process is required at each terminal unit 28 to demodulate the same into regular picture signals. If the scrambling process is primitive and very easily descrambled, wiretapping may not be prevented. A high level scrambling method for preventing ready wiretapping has been in demand for the operation of TV signal transfer systems.

There has been often used a grey-sync method in scrambling in accordance with the prior art. However, there was a drawback in that the quality of the picture was worsened when descrambled in accordance with this method and the decoded signal was easily analyzed so as to obtain the information therein. Under these circumstances, the present inventors have proposed a scrambling method for a video signal, as disclosed in U.S. Ser. No. 509,004, in which only the horizontal synchronizing signal is level-compressed, and a decode (key) signal is digitized so as to be added to the horizontal synchronizing signal in the video signal, while this digitized decode signal is analyzed at the receiving side so as to restore the picture. In accordance with this method, however, there may be caused a data error at the time when the key signal for descrambling is received, or an error may caused in the decode signal due to external disturbance, noise or the like, so that it may become impossible to restore the picture to the normal state. Thus, this method was not entirely suitable in practical use.

SUMMARY OF THE IVNENTION

In view of the above mentioned drawback, the present invention provides a method for developing a key signal for descrambling television broadcasting in which a plurality of key signals, which are independent from one another, are added to horizontal synchronizing signals in the same field so as to prevent an obstacle due to data error, noise and the like, thereby making it possible to always restore the normal picture.

BRIEF DESCRIPTION OF THE DRAWINGS

FIG. 10 is a waveform chart showing the relationship of the video signal in the encoder and the carrier and sub-carrier;

FIG. 13 is a view typically showing the relationship of the data signal and the line number;

FIG. 14 is a timing chart showing the state in which the key signal is added, as well as the variance in the signals of parts of the encoder in the horizontal synchronizing signal interval;

FIG. 18 is a view typically showing the array of the data signal and the line number when the data signal is checked by the decoder;

FIG. 21 is a waveform chart showing the state of the video signal as actually modulated by the carrier in respect of the relationship of level-compression and level-expansion; and FIG. 22 is a waveform chart showing the state of the video signal as actually modulated by the carrier wave in respect of the addition and removal of the data signal.

DETAILED DESCRIPTION OF THE PREFERRED EMBODIMENTS

Figure 2:
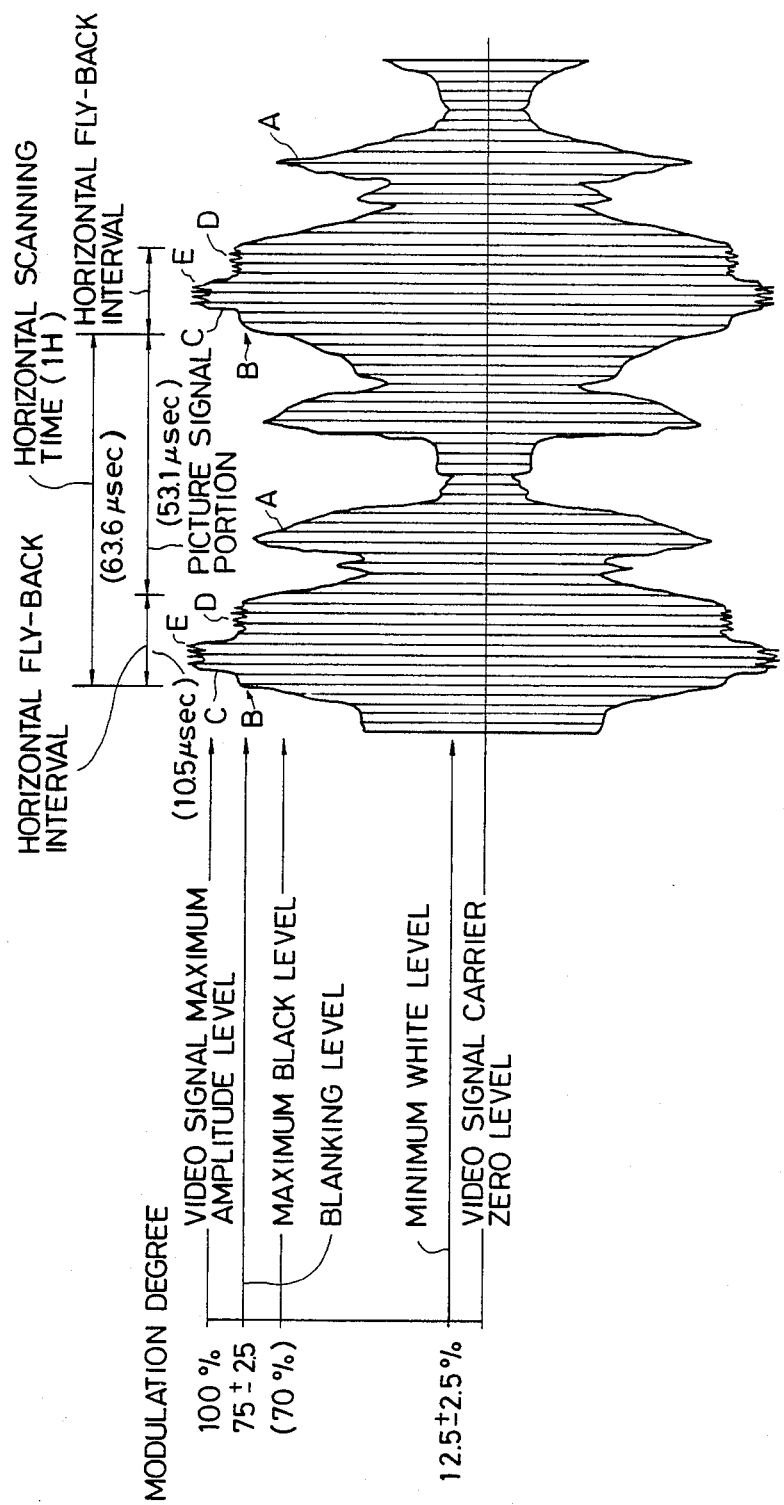
FIG. 2 is a waveform chart showing the horizontal synchronizing signal of the video signal in which a data signal is added.

FIG. 2 shows the wave form of the video signal for the scrambling method according to the present invention. In the video signal are positioned a horizontal synchronizing signal at a 100% level of percentage modulation in relation to the peak carrier; a video signal of the deepest black at about a 70% modulation level; and a video signal of the most white at about a 12.5% level. Consequently, this indicates that with color shades for black and white in a picture being AM modulated in the rnge of 12.5%–70%, only the horizontal synchronizing signal takes a position at the largest amplitude of 100%, and is possible to use for timing synchronization of the scanning lines, upon separating the horizontal synchronizing signal. The signal shown in FIG. 2 represents the condition before being scrambled. In the horizontal flyback line section are a horizontal synchronizing signal C modulated to 100%, and at a shoulder portion having a slightly lower percentage modulation than that for the horizontal synchronizing signal C is added a color burst signal D.

Figure 3:
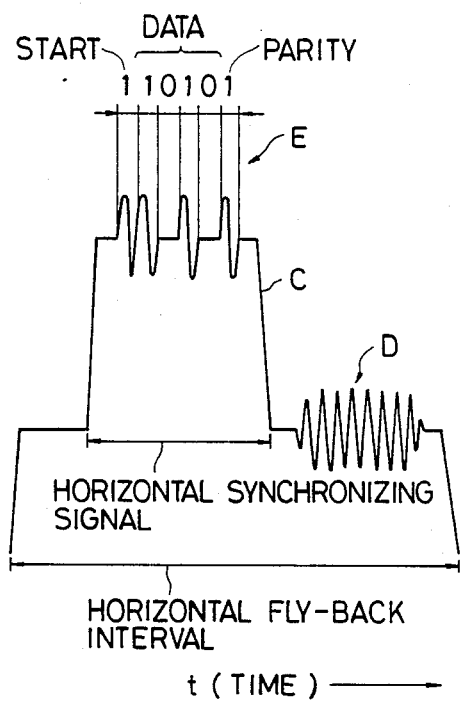
FIG. 3 is an enlarged waveform chart of the horizontal synchronizing signal of FIG. 2.

FIG. 3 shows a scrambling method according to the present invention, indicating a waveform with the addition to the video signal of an address signal containing a key and an address signal for descrambling (a key and an address signal make a data signal), and at the horizontal section of the horizontal synchronizing signal in the video signal is added a data signal E consisting of a key signal. The key signals E are added to more than 10 lines of the horizontal synchronizing signal B after the vertical flyback interval.

FIG. 3 shows an enlarged horizontal flyback line section of FIG. 2, with the data signal E, being a digital code of 6 bits, added to the flat section on top of the horizontal synchronizing signal C. This data signal E defines the first bit in the six as the start bit; the bits from the second to the fifth, the data bits; and the 6th bit, the parity bit. The start bit here indicates the beginning of data, and the parity bit is used for checking a bit error in the data. Because no treatment was performed on the picture signal portions of the video signals treated in the scrambling process, no noise or distortion takes place in the reproduced pictures through demodulation, making possible the reception of pictures of as high quality as those of ordinary TV programs not processed through scrambling and descrambling.

The destruction caused to the transmitted pictures is explained hereunder with reference to FIG. 5.

Figure 5A:
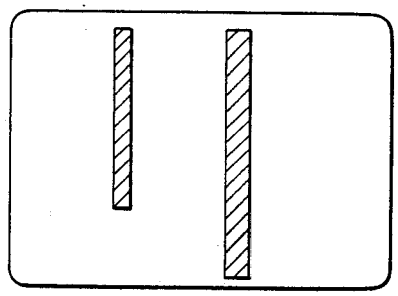
FIG. 5 is a view typically showing an example of the scrambling of the picture screen.
Figure 5B:
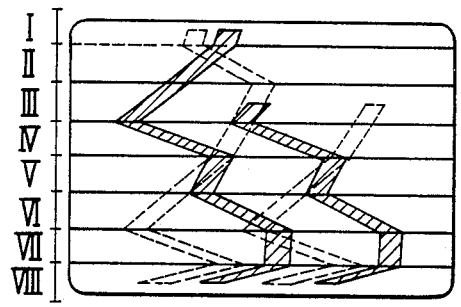

FIG. 5(a) shows schematically a normal picture before the scrambling process; FIG. 5(b) shows an example of pictures reproduced by a TV set 11 upon reception of video signals processed through scrambling, as received. In the scrambling method of an embodiment according to the present invention a picture frame is vertically divided into eight sections (not equally in this embodiment), and each section is reproduced in a manner reflecting whether the horizontal flyback line section (the portion C in FIG. 3) was subjected to level compression, so that horizontal synchronizing signals C in some sections are subjected to level compression but others are not. As a consequence, portions with the horizontal flyback line sections subjected to level compression and those which have not coexist within one picture. Those portions with the horizontal flyback retrace line section having been subjected to level compression are not synchronized, so that portions of the picture flow in a lateral direction, making the picture unrecognizable as a whole. Whether or not the provision of level compression of the horizontal flyback line section is effected in each section from I to VIII, respectively, in a picture frame divided into eight parts is determined by random number information, so the decision is not always the same. The random numbers that determine those horizontal retrace line sections to be subjected to level compression are periodically (at very short intervals) changed, so that no scrambling setting in an identical condition takes place continuously. Consequently, the scrambling process causes pictures in a given section to be continuously unstable on the TV screen, and pictures reproduced without descrambling are as indicated by the broken lines in FIG. 5(b), flowing in a disturbed picture changing upon switching of the random numbers, causing the picture to move continuously. Therefore, the pictures, even if still originally, keep varying violently on the TV screen, disturbed to the extent so as to be unwatchable as they are, if reproduced in the scrambled condition. Information as to the horizontal retrace line sections having been subjected to level compression in sections I–VIII is transmitted to the terminal equipment 28 by means of data bits as shown in FIG. 3, and the reading out of this data bit enables the decoder to initiate descrambling.

Dividing a picture frame into eight sections is merely an example and the division may be freely set to any proper value, for example, four or sixteen.

Figure 4:
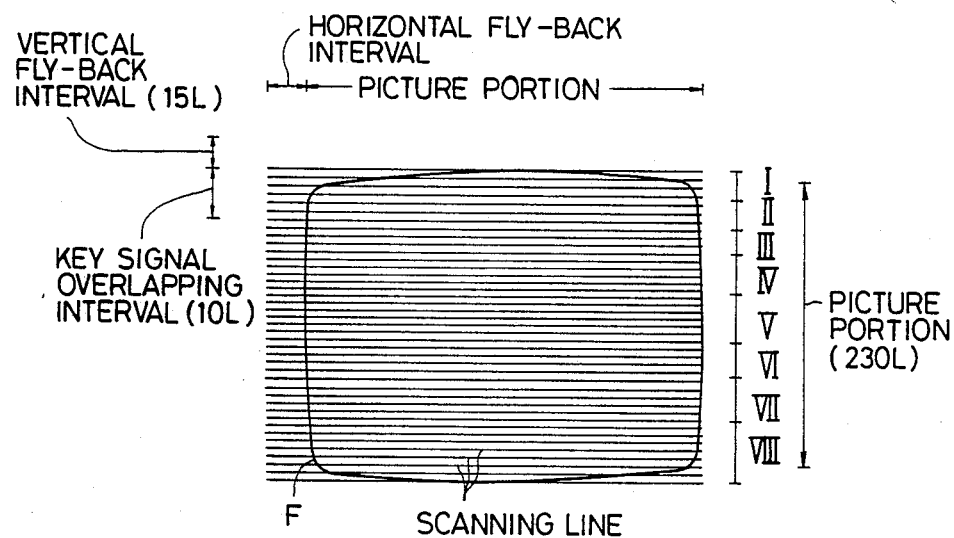
FIG. 4 is a waveform chart showing the overlapping portion of the key signal on the picture screen in the present embodiment.

FIG. 4 schematically shows the relationships between the video signals and the pictures on the screen of the receiver. Some of the scanning lines produced by the video signals do not appear on the receiver, and these are represented by a dozen or so horizontal scanning lines hidden above the screen and forming a vertical flyback (blanking) line section, those horizontal scanning lines before the horizontal flyback and behind thereof, and line sections of respective scanning lines hidden beyond the left hand side of the screen. To some horizontal synchronizing signals C immediately after the vertical flyback line section in the video signals are added the aforementioned key signals E.

Figure 1:
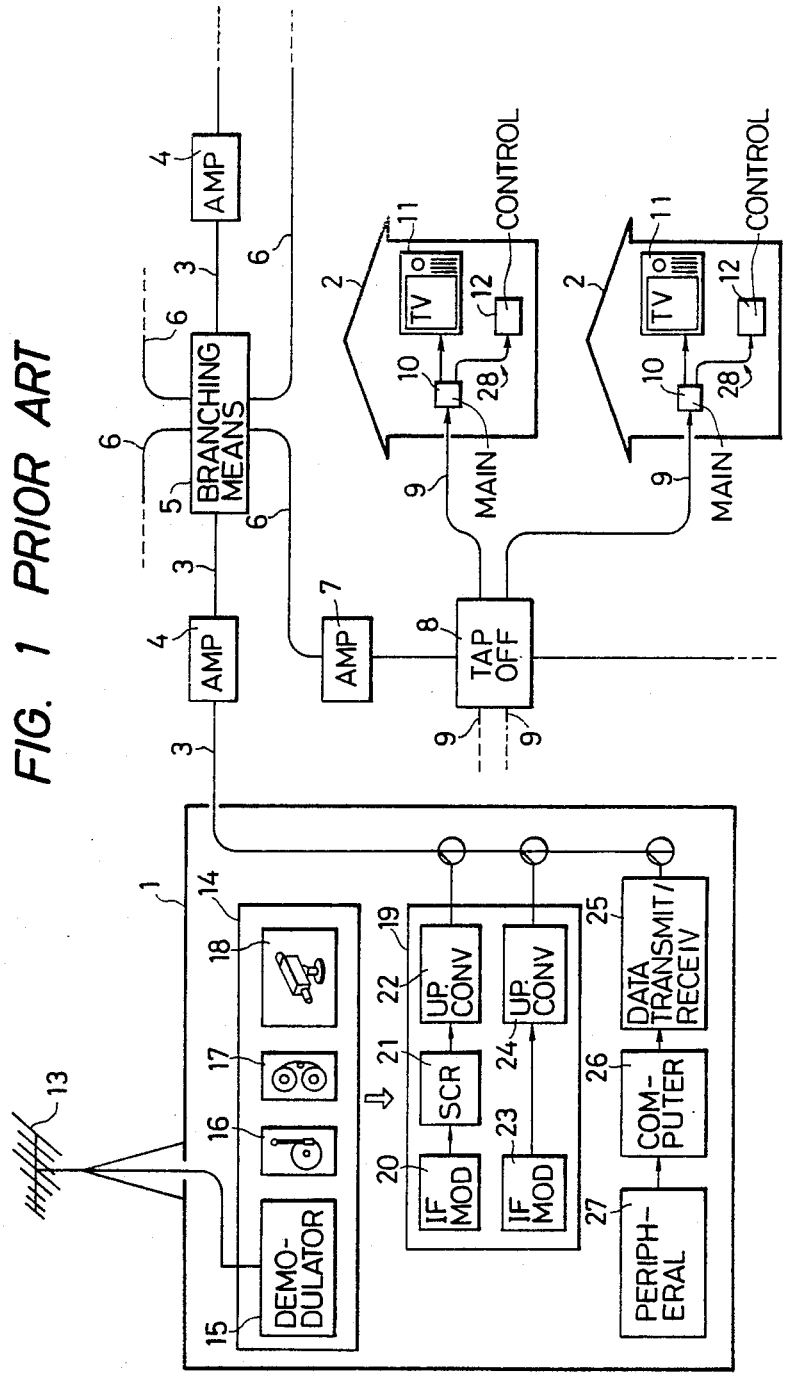
FIG. 1 is a schematic view showing a conventional CATV system.
Figure 6:
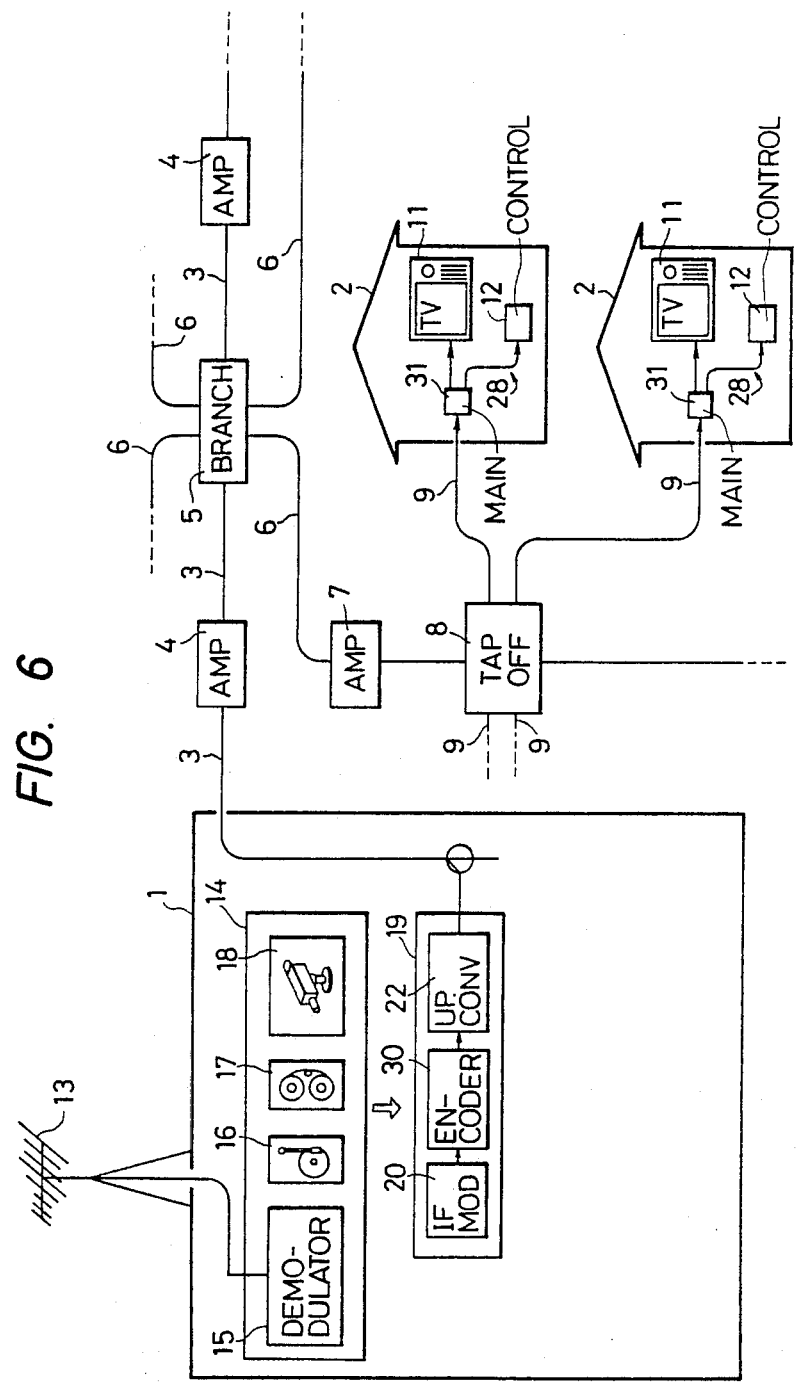
FIG. 6 is a schematic view in which one embodiment in accordance with the present invention is applied to a CATV system.

FIG. 6 shows an exemplary embodiment of the scrambling system according to the present invention as applied to a CATV system, wherein the identical components to those in FIG. 1 have identical reference numbers for the purpose of avoiding duplication in description.

Between an IF modulator circuit 20 and an up converter circuit 22 is provided an encoder 30 for scrambling. Between a sub-branch cable 9 and a TV set 11 are provided a main box 31 with a built-in decoder, and to this main box 31 is connected the control box 12.

Figure 7:
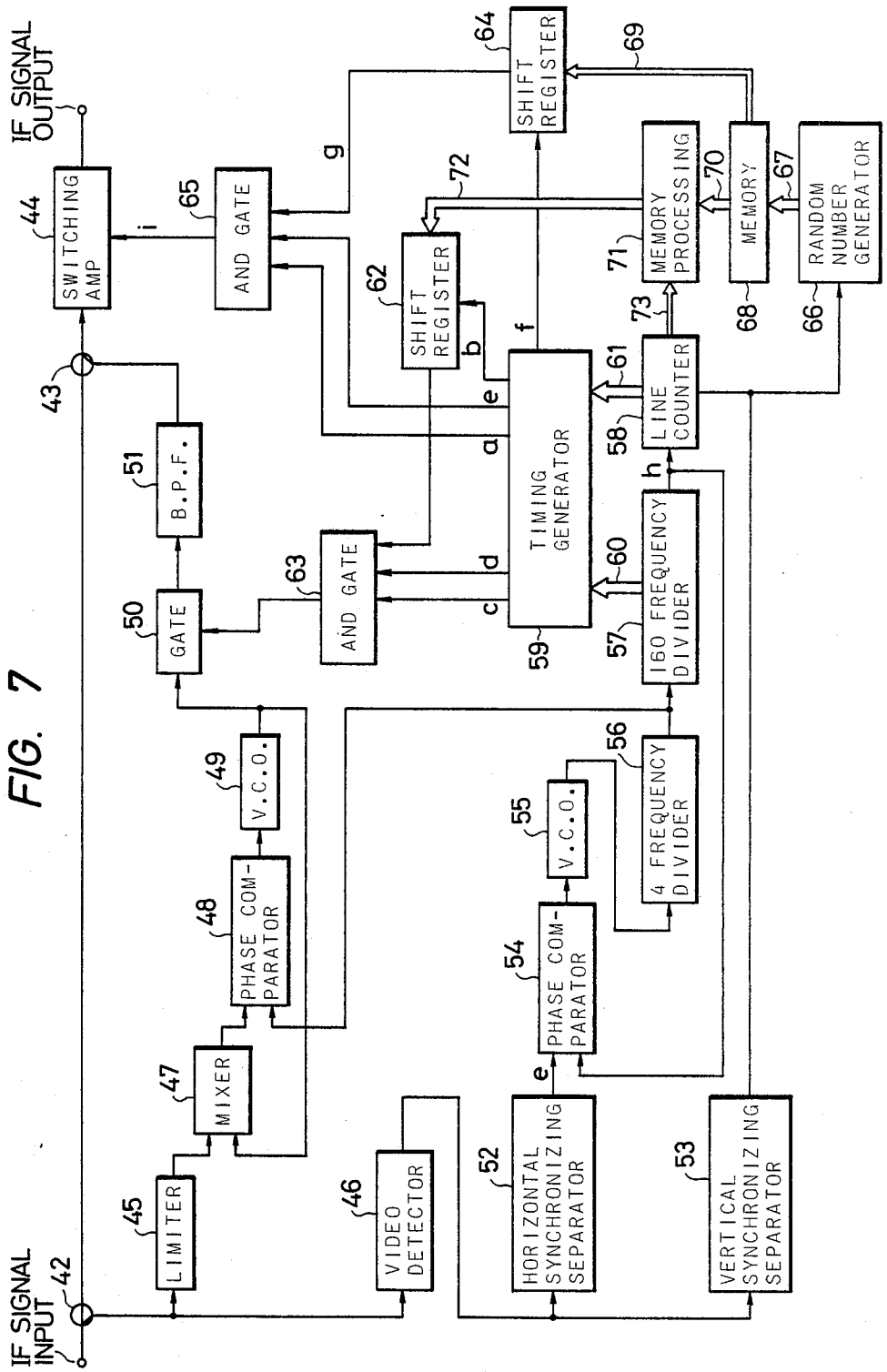
FIG. 7 is a block diagram of the encoder of FIG. 6.

FIG. 7 shows the interior structure of the aforementioned encoder 30. The IF signals enter through a branching unit 42 and are transmitted through the medium of a coupling unit 43. To a terminal branched from the branching unit 42 are connected a limiter circuit 45 and a video detector circuit 46, and to the limiter circuit 45 is connected a mixer circuit 47. Outputs from the mixer circuit 47 enter a phase comparator circuit 48 (incorporating a low pass filter); and outputs from the phase comparator circuit 48 enter a VCO 49. The output of the VCO 49 is connected to the other input terminal of the mixer circuit 47, and the mixer circuit 47, phase comparator circuit 48 and VCO 49 form a PLL. Outputs from the VCO 49 enter the coupling unit 43 through the medium of a gate circuit (switching circuit) 50 and a band pass filter 51. Outputs from the aforementioned video detector circuit 46 enter a horizontal synchronizing separator circuit 52 that functions to separate horizontal synchronizing signals from the video signals, and a vertical synchronizing separator 53 which functions to separate vertical synchronizing signals.

The horizontal synchronizing separator circuit 52 is connected to one input terminal of a phase comparator circuit 54 (incorporating a low pass filter), and outputs therefrom enter a VCO 55, a 4-frequency divider circuit 56 and a 160-frequency divider 57 in this order. Outputs from the divider circuit 57 enter a line counter circuit 58 and the other input terminal of the aforementioned phase comparator circuit 54, respectively. Numeral 59 represents a timing generator circuit that deliver timing signals for controlling the timing of every part of the encoder 30, and this timing generator circuit 49 receives counter/outputs 60 from the 160-frequency divider circuit 57 (which consists of a plurality of flipflops, and each flipflop is capable of generating outputs, respectively) and counter outputs from the line counter circuit 58. Outputs ∓b" from the timing generator circuit 59 enter a shift register circuit 62; outputs "c" and "d" from the timing generator circuit 59 and outputs from the shift register 62 enter an AND gate 63; outputs from the AND gate 63 as control signals enter the gate circuit 50; and outputs "f" from the timing generator circuit 59 enter the shift register circuit 64. Outputs "a" and "g" from the timing generator circuit 59 and outputs "e" from the shift register 64 enter the AND gate 65, respectively; outputs "i" from the AND gate 65, as control signals enter the switching amplifier circuit 44. The output from the vertical synchronizing separation circuit 53 also enters the random number generator circuit 66. The random number output 67 from the random number generator circuit 66 enters the memory circuit 68. The output 69 from the memory circuit 68 enters the shift register circuit 64 and the output 70 from the memory circuit 68 enters the memory processing circuit 71. The output 72 from the memory processing circuit 71 enters the shift register circuit 62. The output 73 from the line counter circuit 58 enters the memory processing circuit 71.

Figure 8:
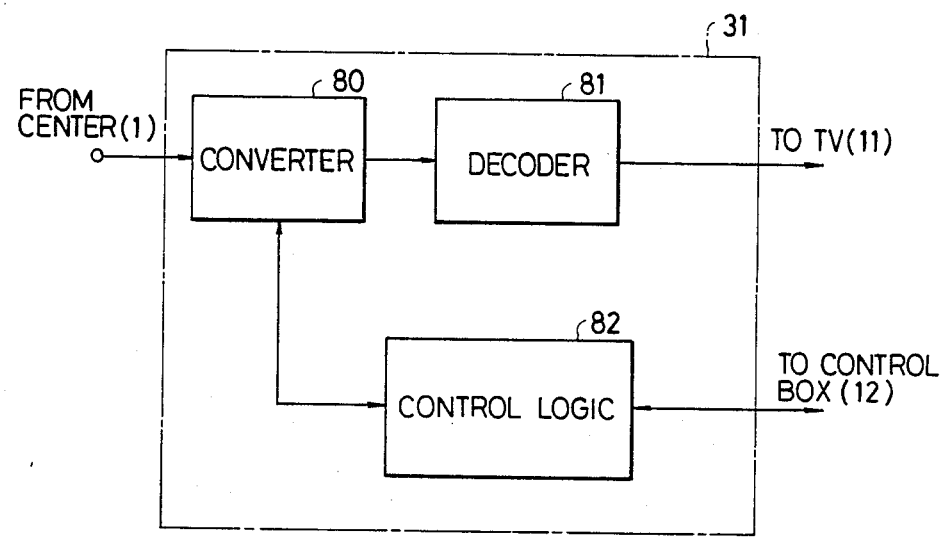
FIG. 8 is a block diagram showing the construction of the main box.

FIG. 8 shows the interior of aforementioned main box 31 in FIG. 6, wherein the sub-branch cable 9 connects inside the main box 31, to a converter 80 for frequency conversion, outputs from the converter 80 are defined to be for a specific channel (for example, channel 2), outputs from this converter 80 connect the decoder 81 functioning for descrambling, and the decoder 81 is connected to the TV set 11 shown in FIG. 7. The control box 12 for selecting a channel for receiving pictures therethrough connects, inside the main box 31, to a control logic unit 82, and signals for selection of channels from the control logic unit 82 connect to the aforementioned converter 80.

Figure 9:
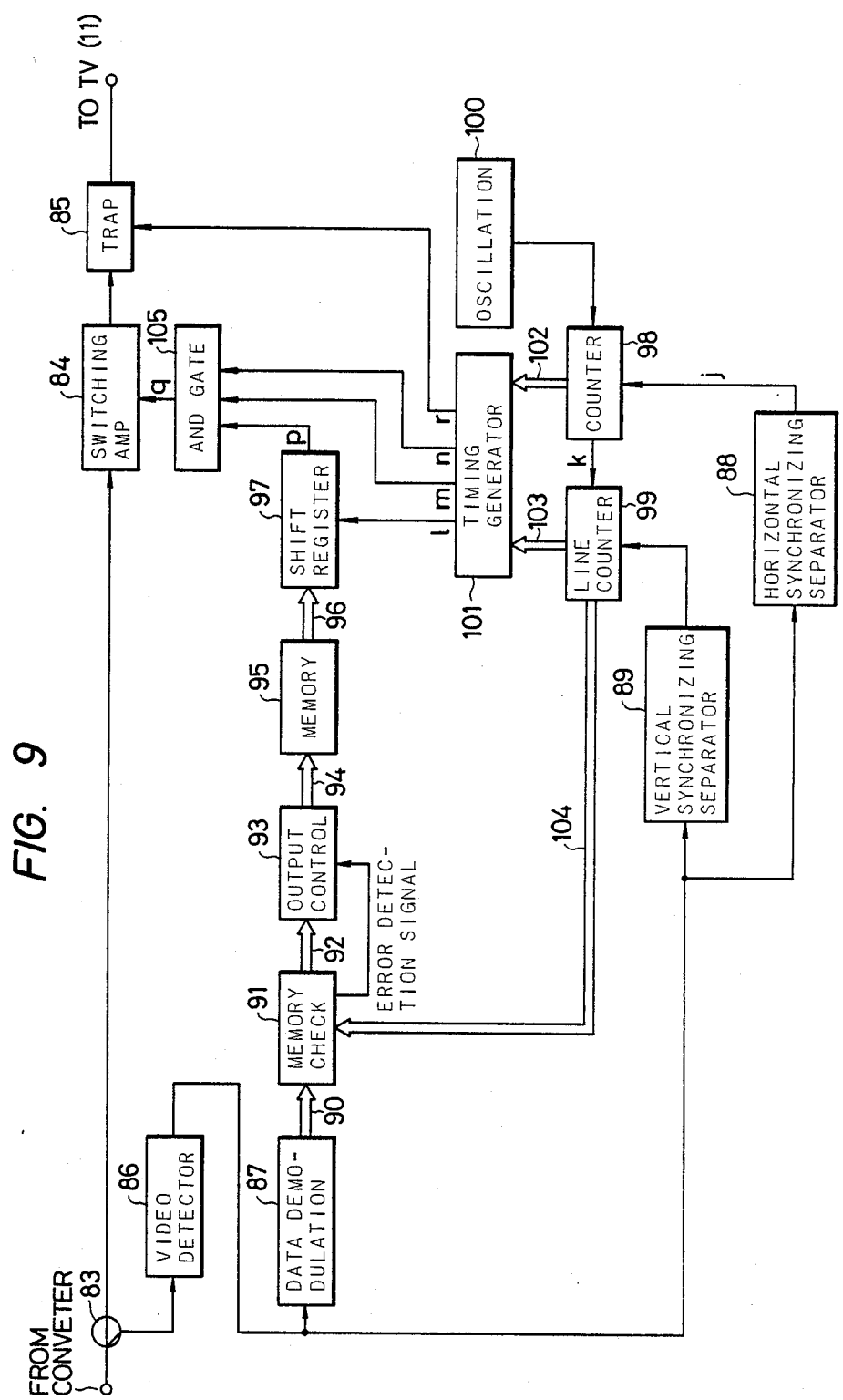
FIG. 9 is a block diagram showing in detail the constitution of the decoder in the main box.

FIG. 9 is a view showing in detail the inner arrangement of the decoder 81 of FIG. 8. A video signal (including an audio signal) is connected to a television receiver 11 via a branching means 83, a switching amplifier circuit 84 which is capable of varying its amplification degree in two stages and a trap circuit 85. The signal which is branched by the branching means 83 is supplied as an input to a picture detector circuit 86. The output of the picture detector circuit 86 is supplied as inputs to a data demodulator circuit 87, a horizontal synchronizing separation circuit 88 and a vertical synchronizing separation circuit 89. A demodulated output 90 of the data demodulation circuit 87 is supplied as an input to a memory check circuit 91. A check output 92 of the memory check circuit 91 is supplied as an input to an output control circuit 93. The control output of the output control circuit 93 is supplied as an input to a memory circuit 95. The memory output 96 of the memory circuit 95 is supplied as an input to a shift register circuit 97. The error detection signal of the memory check circuit 91 is transmitted to the output control circuit 93. In addition, the output of the above mentioned horizontal synchronizing separation circuit, 88 is supplied as an input to a counter 98. The output of the above-mentioned vertical synchronizing separation circuit 89 is supplied as an input to a line counter 99. An oscillation wave from an oscillation circuit 100 is supplied as an input to the counter circuit 98. The output of the counter circuit 98 is supplied as an input to the line counter 99. This oscillation circuit 100 uses a quartz oscillator so as to develop an output of a stable frequency which is 160 times (about 10.07 MHz) the horizontal synchronizing frequency. Reference numeral 101 denotes a timing generator circuit which produces and develops timing signals for controlling each part of the decoder 81.

The counter outputs 102, 103, respectively from the counter circuits 98, 99 are supplied as inputs to the timing generator circuit 101, and the counter output 104 of the line counter circuit 99 is supplied as an input to the memory check circuit 91. The signal 1 of the timing generator circuit 101 is supplied as an input to the shift register 97, and the signal p from the shift register 97 and the signals m, n of the timing generator circuit 101 are respectively supplied as inputs to an AND gate circuit 105. The signal q of the AND gate circuit 105 is supplied as an input to a switching amplifier circuit 84, and the signal r of the timing generator circuit 101 is supplied as an input to the trap circuit 85.

Now, an explanation will be given in respect of the operation of the present embodiment.

First of all, an operational outline in accordance with the present embodiment will be explained with reference to FIG. 6. A key signal (a digital signal for descrambling in order to restore the scrambled picture of the channel to the normal state) is made to overlap the horizontal synchronizing signal of the video signal which is supplied as an input to encoder 30 from an IF modulator circuit 20, and the video signal to which is added the key signal is modulated into a special frequency by an up-converter 22. The key signal which is contained in the video signal is separated by the decoder 81 in the main box 31 at terminal units 28, and the video signal (portions of the horizontal synchronizing signal being compressed) is level-expanded in accordance with the indication of the key signal so as to be demodulated so that the program may be received in a normal state and developed as an output to the television receiver 11. At the television receiver 11, the program of the channel is normally reproduced as the video signal, which is descrambled so as to be seen and heard.

An explanation will first be given in detail in respect of the operation of the encoder 30.

In FIG. 7, the video signal (IF input) which is supplied as an input from the IF modulation circuit 20 is passed through the branching means 42 and the coupling means 43, so as to be supplied as an input to the up-converter 22 as an IF signal output which is a video signal having a key signal overlapped thereon. The amplitude of one portion of the video signal which is branched by the branching means 42 is limited by a limiter circuit 45 so as to lose its AM modulation portion. As a result, only the video carrier is supplied as an input to the mixer circuit 47, so as to be mixed with the output of a VCO 49. The output thereof is supplied as an input to a phase comparator circuit 48, thereby stabilizing the oscillation frequency of the VCO 49 (the mixer circuit 47, the phase comparator circuit 48 and the VCO 49 form a PLL circuit). The oscillation output of the VCO 49 is of a frequency (about 45.75-2.5 MHz) which is somewhat lower than the frequency (about 45.75 MHz) of the video carrier at the limiting circuit 45. The mixer circuit 47 develops the difference between both input frequencies as an output beat frequency (about 2.5 MHz), and the beat frequency is transmitted to the phase comparator circuit 48. The relationship of the frequency in the vicinity of this PLL circuit may be shown as in FIG. 10. W denotes the video signal before being supplied as an input to the limiter circuit 45. X denotes the video carrier in the video signal W after having been passed through the limiter circuit 45. This video carrier X is at about 45.75 MHz. On the other hand, the sub-carrier Y for data overlapping which is developed by the VCO 49 is about 43.25 MHz. The beat frequency Z, which is the output of the mixer circuit 47 to which is supplied the video carrier X and the sub-carrier Y, respectively, is of the frequency difference of about 2.5 MHz. The output (which is 160 times the horizontal synchronizing frequency, that is, about 2.5 MHz) which becomes the reference from the 4-frequency division (demultiplier) circuit 56, is supplied as an input to the phase comparator circuit 48. The output of the frequency division circuit 56 is a frequency which is an integer times the frequency of the horizontal synchronizing signal. The phase comparator circuit 48 works in such a way that the phase of the output signal of this 4-frequency division circuit 56 coincides with the phase frequency Z. The output of the phase comparator circuit 48 is fedback to the VCO 49. As a result, the output of the VCO 49 is lower than the video carrier X by a predetermined frequency. In addition, this beat frequency Z is phase-locked with respect to the reference signal by the horizontal synchronizing signal, so as to be kept in such a way that the oscillation frequency and the phase are stabilized. The frequency of the VCO 49 becomes the sub-carrier Y for the key digital signal which is to be added to the horizontal synchronizing signal, and the output of VCO 49 is supplied as an input to a gate circuit 50. In addition, the video signal from the branching means 42 is detected by the video detector circuit 46, so as to be transmitted to a horizontal synchronizing sepration circuit 52 and a vertical synchronizing separation circuit 53 as an amplitude modulated signal waveform.

The horizontal synchronizing signal and the vertical synchronizing signal are separated at each of the synchronizing separation circuits 52, 53, so that the horizontal synchronizing signal is supplied as an input to a phase comparator circuit 54, and the vertical synchronizing signal is supplied as a reset input to a line counter 58. The output of the above-mentioned phase comparator circuit 54 is supplied as an input to a VCO 55, and the output (of which the frequency is about 10 MHz) of this VCO 55 is supplied to the phase comparator circuit 54 via the 4-frequency division circuit 56 and a 160-frequency division (demultiplier) circuit 57. The phase comparator circuit 54 detects the deviation of the output of the horizontal synchronizing signal VCO 55 so as to make the oscillation wave of the VCO 55 coincide with the phase of the horizontal synchronizing signal (phase locking by PLL). The oscillation of the VCO 55 is one (about 10 MHz) which is 4×160 times the horizontal synchronizing signal interval A (63.6 μsec.) The frequency of the oscillation wave of this VCO 55 is divided by the 4-frequency division circuit 56 so as to have a frequency of about 2.5 MHz, and the oscillation wave is supplied as an input to the phase comparator circuit 48. By the phase comparator circuit 48, the phase of the output of the VCO 49 is also made to coincide with the phase of the beat frequency Z which is formed by the video carrier X. In other words, the phase of the VCO 55 is completely made to coincide with the phase of the beat frequency Z which is determined by the output of the VCO 49 and the video carrier X by the horizontal synchronizing signal contained in the video carrier.

The output of the 160-frequency division circuit 57 and the output of the line counter 58 are supplied as inputs to the timing generator circuit 59, respectively, by the counter outputs 60, 61. This timing generator circuit 59 develops as an output timing signals which instruct the actuation of the encoder 30. In addition, the vertical synchronizing signal from the above-mentioned vertical synchronizing separation circuit 53 is supplied as an input to a random number generator circuit 66. The random number generator circuit 66 develops as an output a pseudo-random number of 8 bits as one unit for every vertical synchronizing signal, and the pseudo-random number is supplied as an input to a memory circuit 68 from a random number output 67. The memory circuit 68 stores the random number outputs in groups of five in turn so as to order them. The random numbers which are stored are developed as memory outputs 69, 70 to a shift register circuit 64 and a memory processing circuit 71. The random number which is developed as an output to shift register circuit 64 is of 8 bits, and this random number is in turn developed as a signal g to an AND gate circuit 65 by a signal f from the timing generator circuit 59. In addition, the random number signal of 8 bits from the memory output is processed at a memory processing circuit 71, and the processed random number is developed as a processed output 72 to the shift register circuit 62 by the counter output 73. The shift register circuit 62 in turn develops the processed signals as outputs to the AND gate circuit 63 with the timing of the signal b from the timing generating circuit 59.

Figure 11:
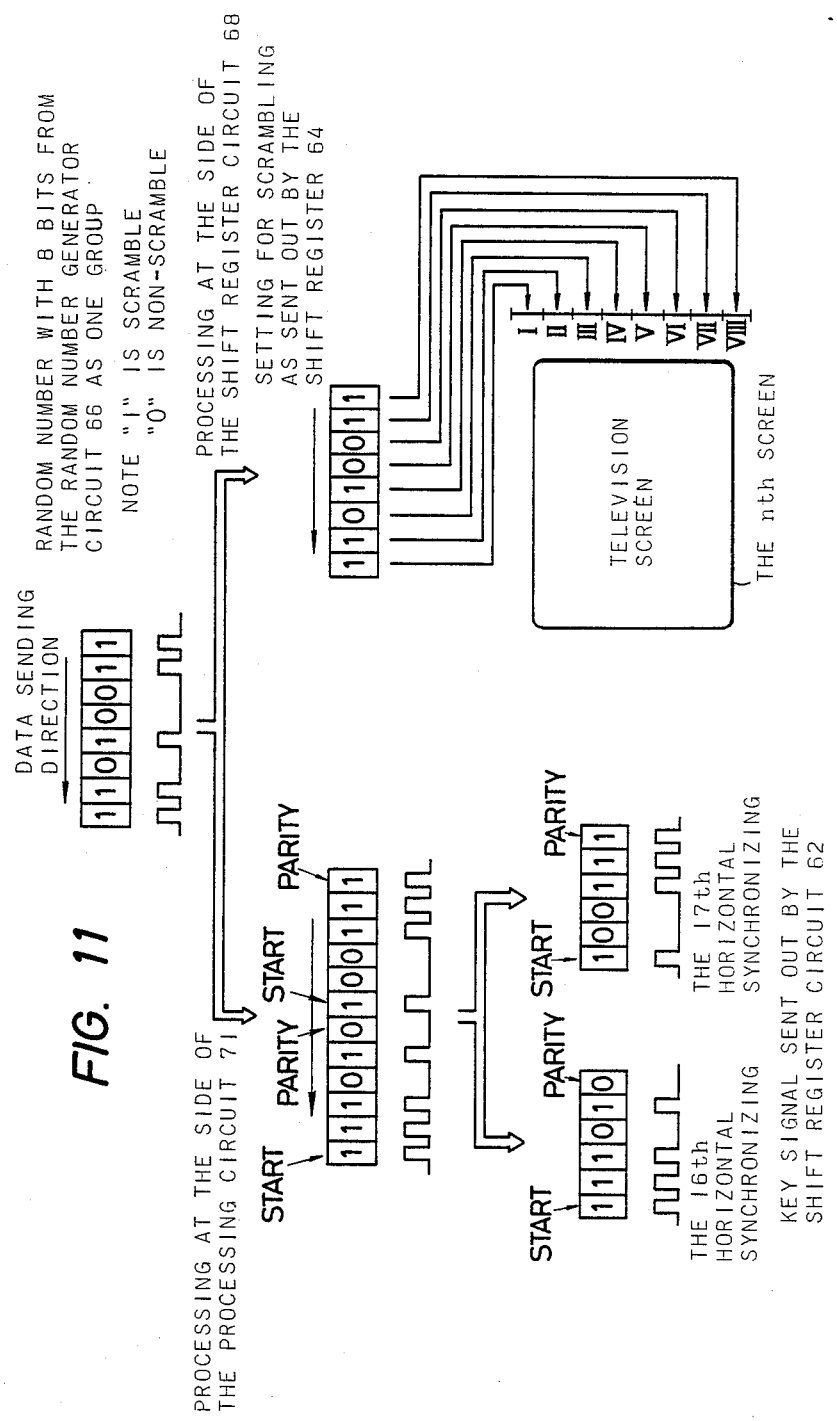
FIG. 11 is an explanatory view showing one key signal which is sent out from the encoder and the processing states thereof.

FIG. 11 is a view typically showing the operative relationship and difference between the random number generator circuit 66, the memory processing circuit 71 and the memory circuit 68. In this drawing, an explanation is given in respect of one random number. The random number generating circuit 66 generates a random number of 8 bits. The random number is composed of the combination of "1"'s and "0"'s. A "1" indicates the level-compression of the horizontal flyback line interval. A "0" indicates non-compression of the horizontal flyback line interval. The random number of 8 bits, which is supplied as an input to the memory processing circuit 71, is divided every four bits, and start bits and parity bits are added before and after the same so as to be processed to become 12 bit signals. The 12 bits of signal are in turn supplied as inputs to the shift register circuit 62 so as to be made to overlap one horizontal synchronizing signal for every 6 bits. In addition, the random numbers of 8 bits are stored as they are in the memory circuit 68. Each bit is allotted to a portion of the television screen, which is divided into eight, so as to set whether the horizontal flyback line interval in each partition is level-compressed or not. In this case, five random numbers are made to overlap the horizontal synchronizing signal in one field as the key signal, and the five random numbers which are made to overlap in each field are descrambled in correspondence with the field overlapped. FIG. 11 shows the n-th random number as well as the n-th screen which is scrambled by the random number.

Figure 12:
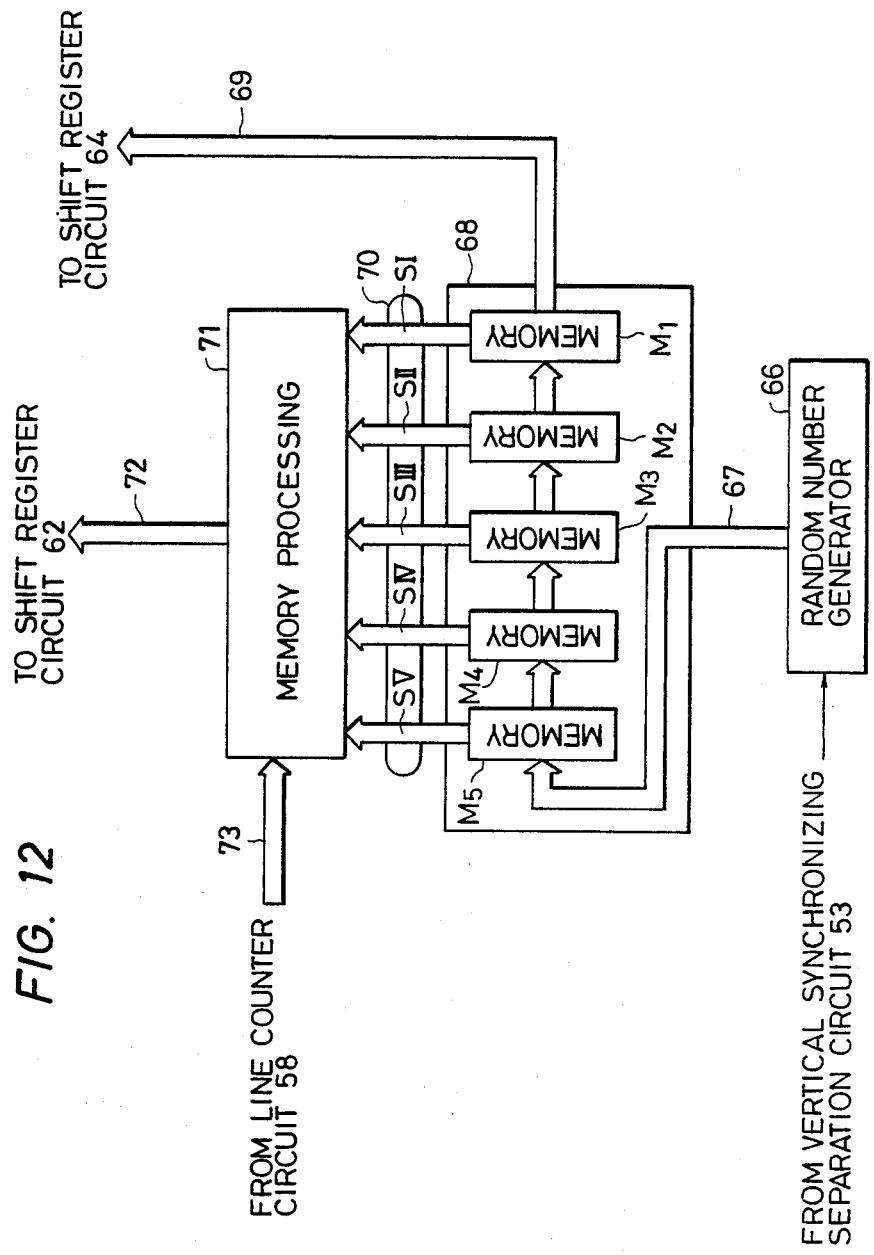
FIG. 12 is a block diagram showing in detail the relationship of the random number generator circuit, the memory circuit and the memory processing circuit.

FIG. 12 is a view showing in detail the relationship of the random number generator circuit 66, the memory circuit 68 and the memory processing circuit 71 mentioned above. Five memories $M_1$-$M_5$ are connected in series in the memory circuit 68. The random number output 67 from the random number generator circuit 66 is supplied as an input to the memory $M_5$. The random number which is supplied as an input to this memory $M_5$ is in turn shifted by the random number signals which are successively supplied as inputs so as to be transferred to the memory $M_1$. Finally, they are developed as outputs from the memory output 69 to the shift register circuit 64. In addition, the above-mentioned memory output 70 is constituted of five data buses SI--SV, so that the random numbers of 8 bits which are respectively stored in parallel independently in the five memories $M_1$-$M_5$ are transmitted to a memory processing circuit 71 by way of the data buses SI-SV. As a result, five random numbers are simultaneously supplied as inputs to the memory processing circuit 71, so as to result in random information of 40 bits total. The five random number information sets are respectively divided into 4 bit signals at the memory processing circuit 71. A start bit is added to the front portion of the random number information in each signal while a parity bit is added to the back portion so as to form 6 bit signals, thereby converting the random number information into an information quantity of 60 bits. Finally, a block check is added thereto so as to process the information into a key signal of 72 bits total per field. FIG. 13 shows the line numbers of the horizontal synchronizing signal as well as the key signal information which is added to this one field. The key signal of 8 bits from $K_1$ to $K_8$, which correspond to the n-th field, is contained in 16L and 17L. In the same manner, one key signal overlaps every two lines. At 26L and 27L are the information parts for block-checking. Each of the parity bits $P_1$-$P_{12}$ is added for checking the data respectively in the lines 16-27L.

The outputs of the AND gate circuits 63, 65 are made "1" or "0" by the signals a, b, c, d, e, which are developed as outputs from the timing generator circuit 59, so that the data signal is developed as an output from the shift register circuit 2. Furthermore, the operation proceeds in such a way that the scrambled signal is developed as a result of the output from the shift register circuit 64. There are contained the following three different actions (A), (B), and (C) in the actuation of each part of the encoder 30 by the timing generator circuit 59.

(A) Allotting of level-compression processing to the horizontal flyback line interval of the portion divided on the screen of one field;

(B) Addition of the five key signals and the block check signal for scrambling to the horizonal synchronizing signal;

(C) Level-compression of the horizontal synchronizing signal in a special region as allotted by the random number.

These actions progress in parallel with one another. An explanation thereof will be given below with reference to the timing charts.

Figure 14:
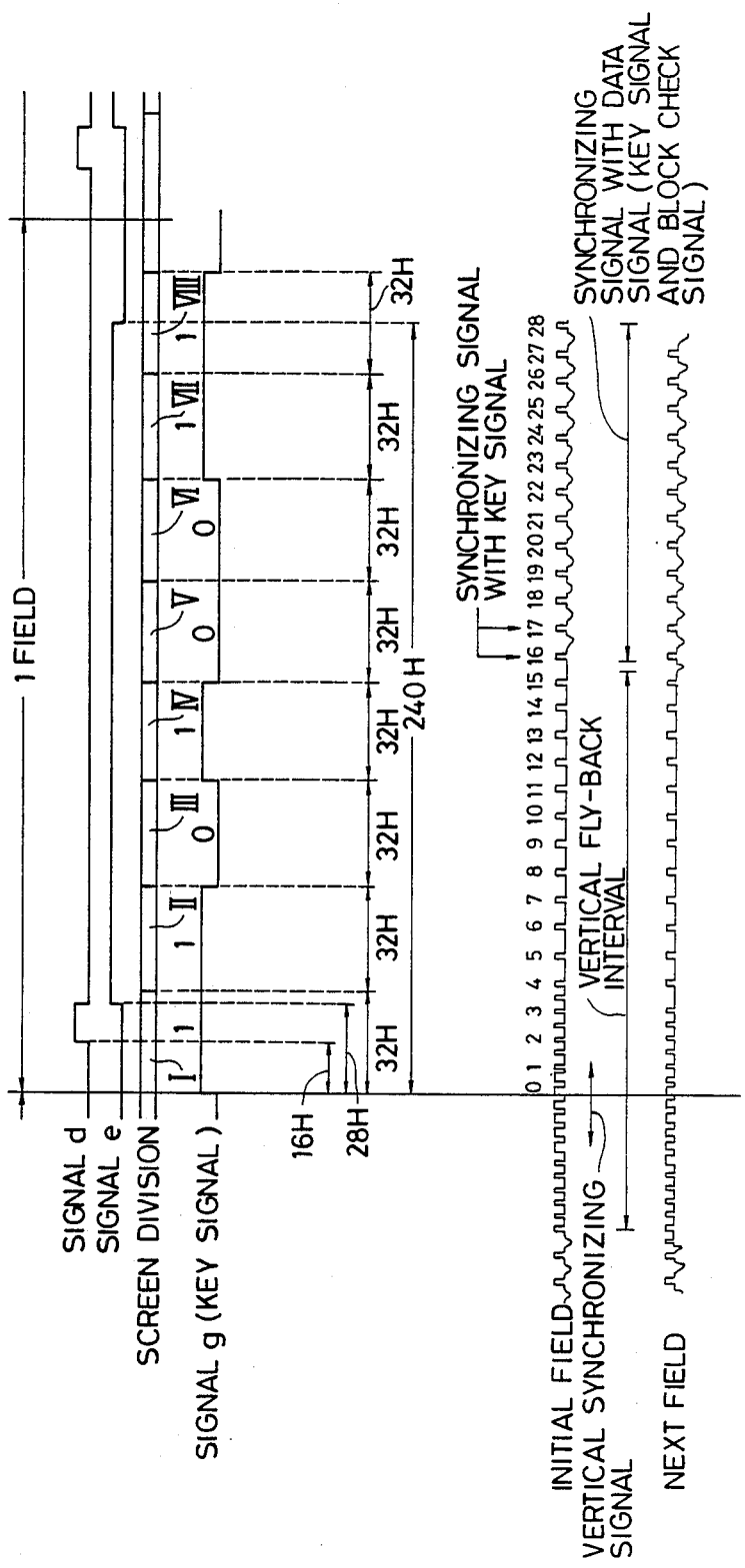
FIG. 14 is a timing chart showing the relationship of the video signal and the variance of the signals of each part of the encoder in one field.

(A) Allotting of the level-compression processing to the horizontal flyback line interval:

FIG. 14 is a view showing the timing of each signal in one field. The upper portion shows the signals d, e, g as well as the regions of the screen as divided into eight in one field. The lower portion shows the video signal. The timing of the upper portion and the lower portion coincides with the time of the start of the field, but the video signal in the lower portion is enlarged.

(1) Start of counting by the vertical synchronizing signal;

The vertical synchronizing signal which is supplied as an input from the video detection circuit 46 is separated in the vertical synchronizing separation circuit. At 3H (H is the horizontal synchronizing period) from the rise of the vertical synchronizing signal, the line counter circuit 58 is reset, and at the same time, a new random number is generated by random number generator circuit 66. This random number is in turn stored in memory circuit 68 as shown in FIG. 12. When the 6th random number is supplied as an input, the first random number is developed as an output of 8 bits from the memory $M_1$ to the shift register circuit 64. From the time when the horizontal synchronizing signal is supplied as an input to the line counter 58, the frequency division output of the 160-frequency division circuit 57 starts to be counted by the line counter circuit 58.

(2) Divisin of the field;

The horizontal synchronizing period H is counted by the starting of the counting of the counter circuit 58, so that the field is divided into eight portions, I-VIII, at every 32H.

(3) Output of the signal for scrambling;

The random number of 8 bits developed from the memory circuit 68 and which is temporarily stored in the shift register circuit 64 forms a random number signal by the instruction of the signal f of the timing generator circuit 58 so as to be developed as the signal g. For example, as shown in FIG. 11, the random number "1,1,0,1,0,0,1,1" is developed as an output by synchronizing the timing of the signals "1" or "0" for each of the eight divided portions. When this signal g is "1", the horizontal flyback line interval at that time is level-compressed. When the signal g is "0", the horizontal flyback interval is not processed at all and is left as it is.

(4) Adding period of the data signal;

Although the line counter circuit 58 counts the horizontal synchronizing period H as mentioned above, the time when the line counter circuit 58 is reset is made the 0-th, and a number is given to the horizontal synchronizing signal which rises at every horizontal synchronizing period H and the number is indicated by L. The number L of the horizontal synchronizing signal which is counted in this line counter circuit 58 is developed as an output to the timing generator circuit 59.

At the timing generator circuit 59, the signal d is kept at the level "1" from the 16L to 27L so as to be sent out to the AND gate circuit 63. As a result, it is possible to add the five key signals and the block check signal for scrambling to the horizontal synchornizing signals in 16-27L. The addition of this data signal will be explained later in detail. (In this case, the horizontal synchronizing signal which enables the addition of the data is possible for each 12H just after the end of the horizontal flyback line interval, but the key signal for descrambling is added only to 16L-25L in accordance with the present embodiment, and the block check signal is added to 26L and 27L.)

(5) Control of the scrambling of the video signal;

The signal e becomes "1" only when the horizontal synchronizing signal is from 28L to 239L and the signal is supplied to the AND gate circuit 65. Therefore, when the signal e is "0", the output of the AND gate circuit 65 is always "0" without regard to the random number signal g for the level-compressing of the horizontal flyback interval. Thus, no processing is effected during 0-27L and after 240L. Even if the signal g is "1", the output i of the AND gate circuit 65 in this interval becomes "0" so that it is possible to receive the picture as it is. However, almost all the screen is scrambled so that it is, in fact, impossible to see and hear the program in a normal state unless the descrambling treatment is effected.

(6) Level-compression of the horizontal flyback interval;

The signal i which controls the switching amplifier circuit 44 is supplied from the and gate circuit 65 but the AND gate circuit 65 does not develop a signal of "1" as an output the signals a, e, g are simultaneously supplied thereto as inputs. When these three signals are supplied, the AND gate circuit 65 lowers the amplification degree of the switching amplifier circuit 44 so as to level-compress the horizontal flyback interval (This level-compression will be explained later).

Figure 15:
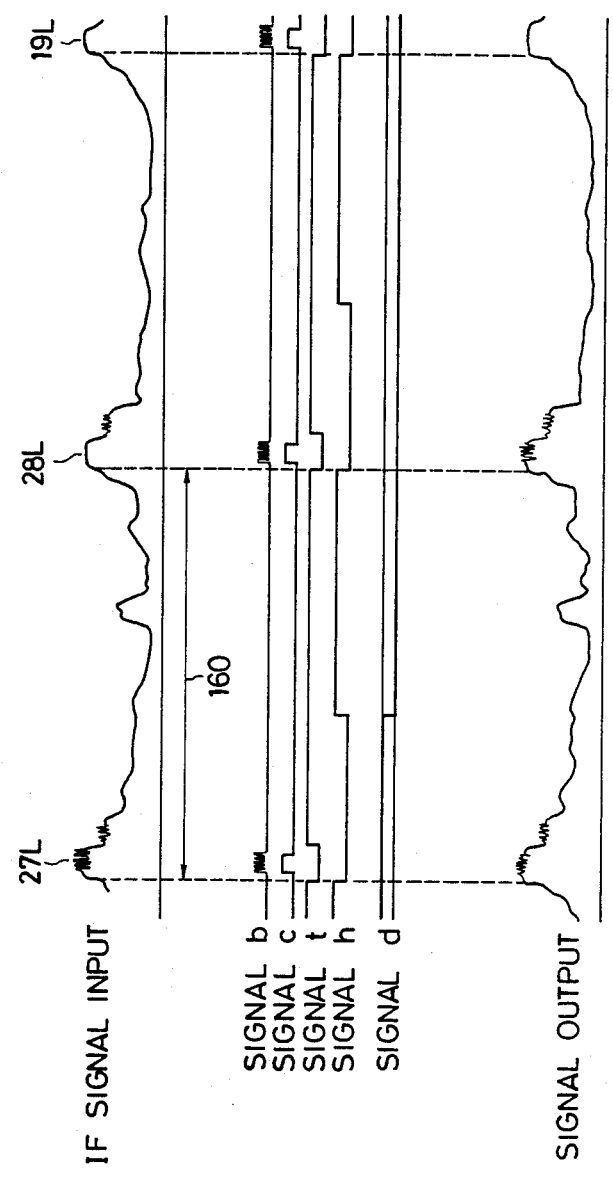

(B) Addition of the block check signal and the key signal for descrambling to the horizontal synchronizing signal:

Since the encoder 30 effects the scrambling processing by level-compressing the horizontal flyback interval, the key signal is required for descrambling in order to reproduce the normal picture at the side of the decoder 31. FIG. 15 is a timing chart showing the process of adding this data signal to the horizontal synchronizing signal. Based on this, the addition of the key signal will be explained. The video signal at the upper stage is the IF signal prior to being supplied as an input to the encoder 30, while the video signal at the lower stage is the IF signal after being developed as an output from the encoder 30. In accordance with this embodiment, the horizontal synchronizing signal interval is equally divided by 160, so that each signal is developed as an output with the timing of the 1/160 interval as the reference clock.

(1) Formation of the oscillation wave for coding the data signal;

As mentioned before, a PLL circuit is formed by the mixer circuit 47, the phase comparator circuit 48 and the VCO 49. At the phase comparator circuit 48, a frequency which is lower than the video signal carrier by about 2.5 MHz is always stably supplied to the gate circuit 50 by the VCO 49. The oscillation wave of this VCO 49 becomes the sub-carrier wave of the data signal.

(2) Formation of signals continuously generated;

The clock signal with the horizontal synchronizing signal from the 160 frequency-division circuit 57 and the line counter 68 as the reference is supplied as an input to the timing generator circuit 59. The phase of the frequency of the 160 frequency-division circuit 57 is made to coincide with the phase of the oscillation wave of the VCO 49 by the phase comparator circuits 48, 54. Hence, the timing generator circuit 59 has nothing to do with the input of other signals, and the signals b, c, h are always developed as outputs at the predetermined times with the horizontal synchronizing signal as the reference. These signals b, c, h fall with the rise of the horizontal synchronizing signal which is developed as the output from the horizontal synchronizing separation circuit 52. The fall of the signal t which is at the "0" level only during the period of time of 12/160 H is made the reference.

Firstly, the signal b is generated in the vicinity of the center of the horizontal synchronizing signal t and is used as the shift lock of the shift register circuit 62. This signal b is developed as an output of 6 cycles with the frequency of 160 times the horizontal synchronizing frequency. The signal c is used for opening the AND gate circuit 63, and this signal is generated at the same time as when the signal b is developed as an output. The signal h is the 160 frequency-division output of the 160 frequency-division circuit 57. This signal falls when the horizontal synchronizing separation signal t falls and rises substantially at the middle point of each horizontal synchronizing signal. At the time when the signal h rises, the line counter circuit 58 counts up. The signals b, c, h are always generated.

(3) Signals generated for adding the data signal;

The data signal, which is the key signal and the block check signal, is not added to all the horizontal synchronizing signals but added only to horizontal synchronizing signals at a special location, that is, from 16L to 27L in this embodiment. As a consequence, the timing generator circuit 59 develops as an output the signal d, which designates the horizontal synchronizing signals to which to add this data signal. The signal d becomes "1" only when the data signal is added to the horizontal synchronizing signal, and the time when it is switched to "1" or "0" is at a time when the signal h varies. Hence, the timing is set so that an influence may not be exerted upon the horizontal synchronizing signal. In accordance with the present embodiment, the signal d is "1" at the time of the horizontal synchronizing signals from 16L to 27L.

(4) Addition of the data signal to the horizontal synchronizing signal;

As mentioned above, the sub-carrier from the VCO 49 is supplied as an input to the gate circuit 50, the signals c, d and the output of the shift register 62 are supplied as inputs to the AND gate circuit 63, and the signal b is supplied as an input to the shift register circuit 62. The AND gate circuit 63 has an output "1" at times when the signals c, d and the outputs of the shift register circuit 62 are supplied as inputs at one time. However, the 6 cycle signal b is in turn supplied as an input to the shift register 62 for each horizontal synchronizing signal. A data signal of 72 bits total as sent from thememory processing circuit 71 is in turn developed as an output with the timing of the signal b. Hence, there are twelve horizontal synchronizing signals, starting from 16L to 27L for each frame. The line numbers of the horizontal synchronizing signals which correspond to the overlapping of the data signals (6 bits by 6 bits) are shown in FIG. 13. As mentioned before, the data signal "1" or "0" as developed as the output from the shift register circuit 62 is passed through the AND gate circuit 63 so as to be supplied as an input to the gate circuit 50. The gate circuit 50 is thus opened and closed by the output of the shift register circuit 62. During the period of time of one cycle of the clock frequency 160 times the horizontal synchronizing frequency per bit, the sub-carrier from the VCO 49 is developed as an output to the coupling means 43 via the bandpassfilter 51, so that the burst signal of the sub-carrier is made to overlap the horizontal synchronizing signal and the envvelope of the horizontal synchronizing signal which is produced becomes a sine wave of one cycle per bit. Thus, a sine wave which corresponds to the data signal is added to the horizontal synchronizing signal from 16L to 27L. The AND gate circuit 63 is not actuated at all for the horizontal synchronizing signals after 28L, so that the data signal is not added.

(C)Level-compressing the horizontal synchronizing signal in regions of the screen as allotted by the random number;

As shown in FIG. 5(b), the television screen is divided into eight portions. Whether each of those divided portions is scrambled or not is set by thee random number, which is generated by a random number generator circuit 66 and stored in a shift register circuit 64 by way of a memory circuit 68. Since the random number which is stored in this shift register circuit 64 has passed through five memories in a memory circuit 68, it is absolutely different from the random number which is supplied as an input to the shift register 62 by the memory output 72 (i.e., six lines behind). The random number which is stored in the shift register circuit 64 is used for scrambling the screen. The five random numbers which are stored in the memory are used as key signals for scrambling the next screen as well as screens which follow it. The horizontal synchronizing signal at the portions of the picture to be broken up are level-compressed to effect scrambling. The operation of this level-compression will be explained with reference to FIG. 16. In this drawing, the video signal in the upper stage is of the waveform prior to being supplied as an input to the encoder 30,, while the video signal in the lower stage is of the waveform developed as an output from the encoder 30.

(1) Signals constantly generated;

The signal a which becomes "1" from 7/160H in front of the reference, which is the rise of the horizontal synchronizing signal, to 26/160H back of the reference is always developed as an output from the timing generator circuit 59. The signal a is always synchronized so as to be developed as an output to the AND gate 65 when the horizontal synchronizing signal is generated. The signal h is also always developed as an output in the manner mentioned before.

(2) Signals generated at the time of level-compression;

The control signal f is developed as an output from the timing generator circuit 59 to the shift register circuit 64, and the shift register circuit 64 in turn sends out the rando number of 8 bits, supplied as an input from the random number generator circuit 66 via the memory circuit 68, as the signal g. This signal g in turn develops the random number of 8 bits as an output for periods of time which are divided every 32H as shown in FIG. 14, so that the output of the signal "1" or "0" continues to be maintained during each period of 32H. The switching time of the signal g is the rise time of the signal h and is at a position distant from the horizontal synchronizing signal. In addition, the signal e develops the signal "1" as an output from 28L to 239L in one field as shown in FIG. 14.

(3) Level-compression of the horizontal flyback line interval;

As mentioned before, the signals a, e, g are respectively supplied as inputs to the AND gate circuit 65. When all the signals a, e, g are "1", the AND gate circuit 65 output signal i is "1" so as to lower the amplification degree of the switching amplifier circuit 44. Hence, the portion of the horizontal flyback interval 33/160H from 7/160H in front of the rise thereof to 26/160H back of the rise thereof in the corresponding horizontal synchronizing signal is level-compressed as shown at the left side of the lower portion of FIG. 16, so as to be moved to the gray level, thereby effecting what is called the "grey sync treatment". However, the AND gate circuit 65 output is "0" even if the signal a is supplied as an input if either of the signals e and g which are also supplied as inputs becomes "0". As a result, level-compression by the switching amplifier circuit 44 is not effected, so that the signal is normally amplified by the switching amplifier circuit 44 in the horizontal flyback interval which corresponds to the position as indicated at the central part in FIG. 16.

Thus, the data signal for descrambling is added to the horizontal synchronizing signal of the video signal at the side of the encoder 30, and selected horizontal flyback line intervals are level-compressed, thereby effecting scrambling. However, it is required that the picture which is so broken be demodulated at the side of the decoder 31.

The following treatments (D), (E) and (F) are effected in the decoder 31:

(D) Receiving and analyzing the data signal which is used in descrambling.

(E) Removing the key signal added to the horizontal synchronizing signal.

(F) Level-expanding the horizontal flyback line intervals as level-compressed.

In the following, each treatment will be explained in detail. The video signal which is supplied as an input to the decoder 31 is passed through a branching means 83 as well as a switching amplifier circuit 84 and a trap circuit 85 so as to be transmitted to the television receiver 11. The switching amplifier circuit 84 has two amplification degrees. When the signal q of an AND gate circuit 105 is "1", the amplification degree becomes high. The trap circuit 85 performs the trap function only when the signal r is "1". The video signal which is supplied as an input to the video detector circuit 86 by the branching means 83 is detected so as to be supplied as inputs to a horizontal synchronizing separator circuit 88 and a vertical synchronizing separator circuit 89 respectively, thereby developing the horizontal synchronizing signal and the vertical synchronizing signal as outputs to a counter circuit 98 and a line counter 99 respectively. The line counter circuit 99 is reset by the output of the vertical synchronizing separation circuit 89. This reset signal is developed as an output at the time 3H counted from the rise of the vertical synchronizing signal in the same way as in the encoder 30. In addition, the counter circuit 98 is reset by the signal from the horizontal synchronizing separation circuit 88, and after that, the stable frequency 2.5176 MHz from the oscillation circuit 100 is counted so that the horizontal synchronizing signal interval is correctly equally divided by 160, thereby transmitting a counter output 102 to a timing generator circuit 101. The output k (1/160 frequency-division output) of the counter 98 is supplied as an input to the line counter 99. This output k is like the signal h of the 160 frequency-division circuit 57 of the above-mentioned encoder 30. This output rises substantially at the central position of the horizontal synchronizing signal. The line counter circuit counts this rise. Even in case horizontal synchronizing separation is not effected because of the level-compression of the horizontal flyback interval which accompanies the scrambling treatment, the oscillation wave of the oscillation circuit 100 is subjected to the 160 frequency-division by the counter circuit 98, making it possible for the correct timing to continue to be kept. The timing generator circuit 100 analyzes the signals which are transmitted from the counter circuit 98 and the line counter 99 by the counter outputs 102, 103 so as to instruct the actions of the decoder 81 by various signals l, m, n, r. In this case, the timing generator circuit 101 develops as an output the signal n which is "1" at 28L–239L, the signal 1 for the screen division at every 32H from the start, the signal r at the time of the horizontal synchronizing signal from 16L to 27L and the signal m in the horizontal flyback interval of each synchronizing signal.

The above-mentioned processes (D), (E), (F) will now be described in detail.

(D) Receiving and analyzing the key signal which is used for descrambling.

The data demodulator circuit 87 separates and receives the data signal (including the key signal) which is in the video signal as detected by the above-mentioned video detector circuit 80 and transmits the data signal to the memory check circuit 91 by way of the demodulation output 90. The data signal which is developed as an output from the data demodulator circuit 87 is a signal of 6 bits inclusive of a start bit and a parity bit, which is developed as an output for every horizontal synchronizing signal. The memory check circuit 91 in turn stores, orders and checks the data signal which is supplied as an input so as to transmit it to an output control circuit 93 with the timing of the counter output 104 from the line counter circuit 99. At this memory check circuit 91, a parity check as to whether the data signal which is supplied as an input is correct or not as well as a block check are performed. If the data signal is incorrect, an error is judged so that an error detection signal is transmitted to the output control circuit 93, thereby preventing the data signal from being used. Both the check output 92 and the control output are the five random numbers which are developed as outputs in parallel with one another. The five random numbers are respectively stored in the memory circuit 95. They are supplied in groups of 8 bits as memory outputs to the shift register circuit 97. At this shift register circuit 97, it is possible to develop the random numbers (key signals) which are supplied as inputs in turn, bit by bit for every signal l, as the signal p.

Figure 17:
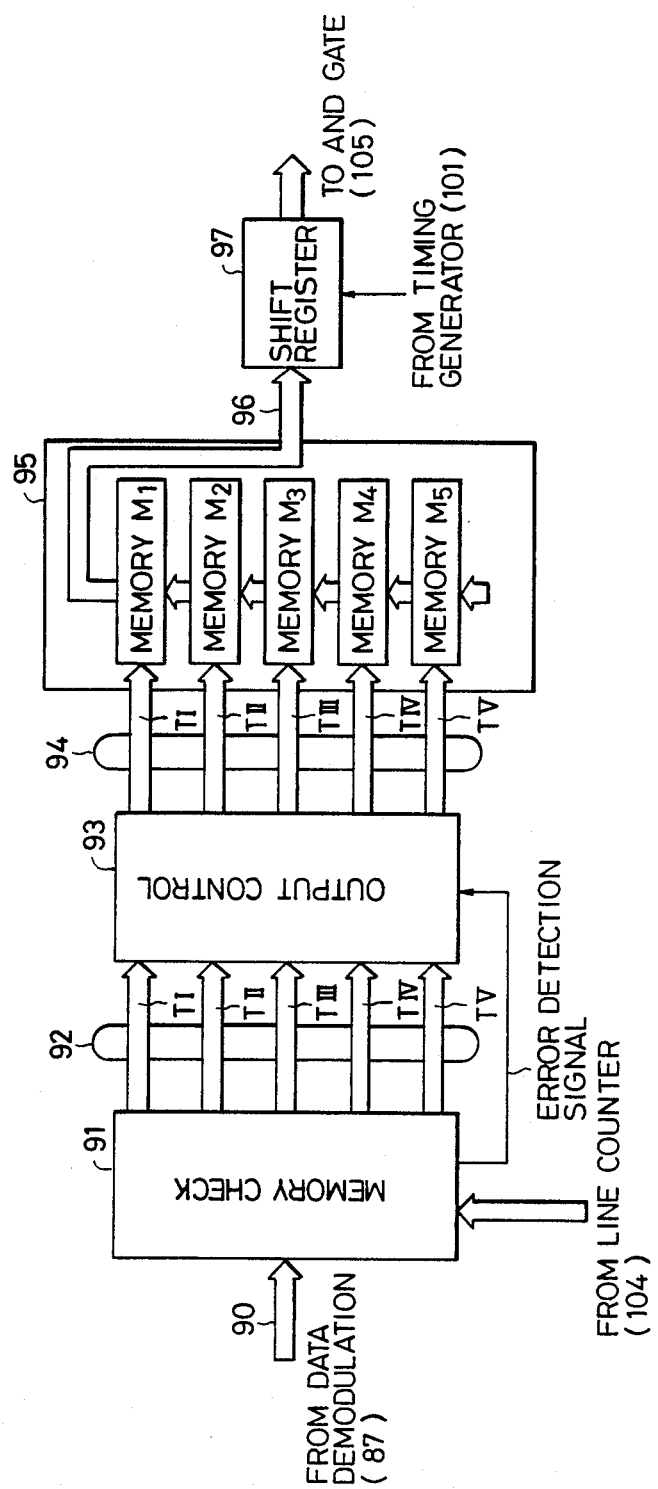
FIG. 17 is a block diagram showing in detail the relationship of the memory check circuit, the output control circuit and the memory circuit.
Figure 19:
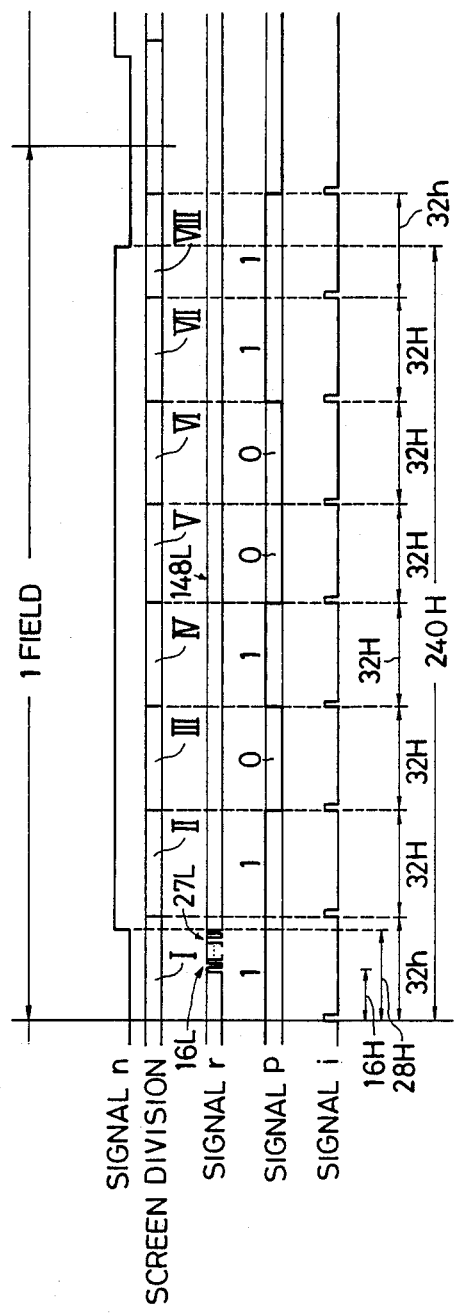
FIG. 19 is a timing chart showing the variance of the signals of parts of the decoder in one field.

FIG. 17 is a view showing in detail the constitution of the memory check circuit 91, the output control circuit 93 and the memory circuit 95. The check output 92 is composed of five data buses TI–TV, which are connected as inputs to the output control circuit 93 in such a way as to be independent from one another. The control output 94 of the output control circuit 93 is also likewise composed of five data buses TI–TV. The data buses of the check output correspond to those of the control output 94. The output control circuit 93 is able to switch the data buses TI–TV depending upon whether an error detection signal exists or not. The data buses TI–TV of the control output 94 are respectively connected as inputs to five memories $M_1$–$M_5$ in the memory circuit 95. The stored contents may be shifted to the higher memories in order in such a way that the memory $M_1$ content is input from the memory $M_2$ and the memory $M_2$ from the memory $M_3$ etc, so that the contents in the memory $M_1$ are developed as an output to the shift register 97 by the memory output 96. In accordance with this arrangement, the data demodulator circuit 87 separates the signal which overlaps the horizontal synchronizing signal so as to be developed in turn as an output to the memory check circuit 91. The line numbers which correspond to the data output from the data demodulator circuit 87 may be typically as shown in FIG. 18. All the signals of 12 lines, which are supplied as inputs to the memory check cicuit 91, are stored while arranging the data signals in FIG. 18 by the counter output 104 from the line counter circuit 99. The data bits $K_1$–$K_4$ of the lines are checked by the parity bits. Each group of data bits of 8 bits of two lines forming the key signal is checked by the block check bits $B_1$–$B_8$. In the key signals of the two lines 16 and 17L, 18 and 19L, 20 and 21L, 22 and 23L, and 24 and 25L, the parity check bits are removed so as to combine the four bit groups 8 bits by 8 bits to make five key signals (random numbers), which are then transmitted to the output control circuit 93 by way of the data buses TI–TV. If there is no error in the data signal in the output control circuit 93, the signal is developed as an output from the control output as it is. However, if there is a data error, the error check signal is transmitted to the output control circuit 93, and the output control circuit 93 prevents the control output from being developed as an output. The data buses TI–TV for the control output 94 are connected as inputs to the memories $M_1$–$M_5$ which are independent from one another, so as to store information therein. Each key signal which is stored is shifted up into an upper memory by the signal for every vertical synchronizing signal as applied as an input to the memory $M_5$, so that the key signal which is the stored content of the memory $M_1$ is supplied as an input to the shift register circuit 97. Therefore, there are always stored five key signals (random numbers), which correspond to the following five fields, in the memory $M_1$–$M_5$, and new key signals always replace these by the data buses TI–TV of the output control circuit 93. However, in case a new key signal is not supplied as an input from the data buses TI–TV due to a data error, the key signal which is already stored in the memory circuit 95 is shifted in such a way as to correspond to the descrambling of each field, so as to be supplied in turn as an input to the shift register circuit 97. Therefore, if the five key signals are always correctly supplied as inputs to the memory circuit 95, it is possible to effect perfect descrambling using the key signals which are stocked in the memories $M_1$–$M_5$ of the memory circuit 95 even if a data error is thereafter caused five times.

Figure 20:
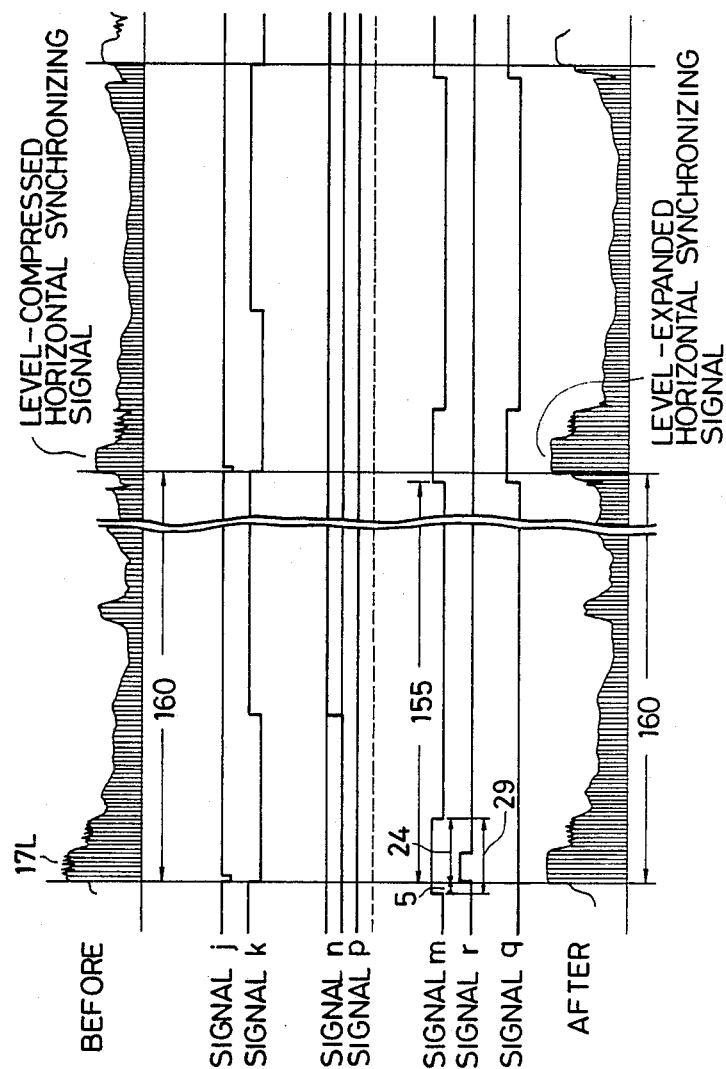
FIG. 20 is a timing chart showing the video signal after having been descrambled, as well as the variance of signals of parts of the decoder in the horizontal synchronizing signal interval.

(E) Removing the key signal added to the horizontal synchronizing signal:

The data signal as shown in FIG. 3 is added to the horizontal synchronizing signal from 16L to 27L as mentioned above. Therefore, if the data signal is supplied as an input to the television receiver 11 as it is, there is a fear that unfavourable influence will be exerted upon the reproduced picture due to the data signal. Hence, it is required that the data signal be removed in the decoder 81. Thus, the signal r which becomes "1" during 11/160H from the rise of the horizontal synchronizing signal is developed as an output to the trap circuit 85 in correspondence with each horizontal synchronizing signal from 16L to 27L in the timing generator circuit 101. By this signal r, the data signal which is added in the horizontal synchronizing signal from 16L to 27L is removed in the trap circuit 85. Since this signal r is applied only to the horizontal synchronizing signal to which is added the data signal, the signal is not generated in the period of time of other horizontal synchronizing signals. The portion at the left side in FIG. 20 shows the process in which the data signal is removed by the signal k. The wave form at the upper stage in FIG. 20 shows the video signal prior to being supplied as an input to the decoder, while the wave form at the lower stage shows the video signal which is developed as an output from the decoder 81.

(F) Level-expansion of the horizontal fly-back interval which is level-compressed:

Since the horizontal fly-back interval at the portion which breaks up the picture is level-compressed at the encoder 30 as mentioned above, it is required that the horizontal fly-back interval at the portion which is level-compressed be level-expanded in accordance with the key signal which is analyzed at the decoder 81. The output p of the shift register circuit 97 and the signals m, n of the timing generator circuit 101 function in this level-expansion.

Figure 16:
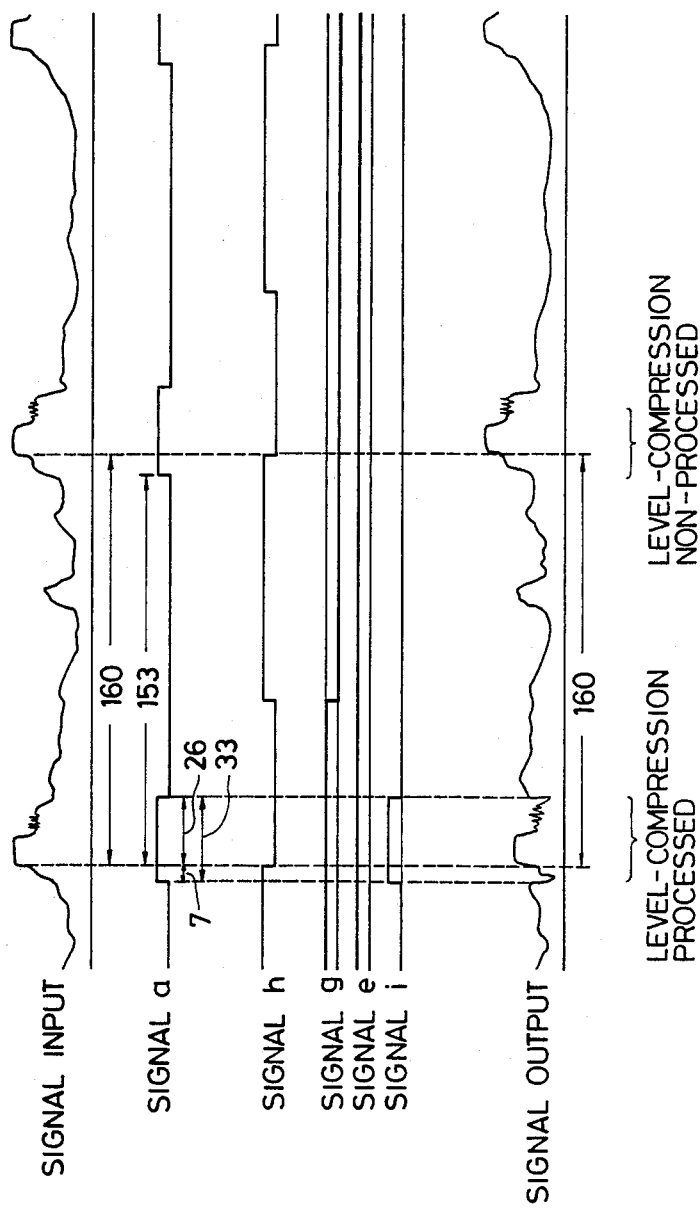
FIG. 16 is a timing chart showing the function of the level-compression of the horizontal synchronizing signal.

(1) Signals constantly generated;

The horizontal synchronizing separation circuit 88 develops the signal j which falls at the rise of the horizontal synchronizing signal in which the horizontal fly-back interval is not level-compressed. The counter circuit 98 is reset by the fall of this signal j so that the oscillation output of the oscillation circuit 100 is subjected to 160 frequency-division. The signal k which is subjected to 160 frequency-division is developed as an output to the line counter circuit 97, and the counter output 102 is developed as an output to the timing generator circuit 101. The line counter circuit 99 counts the line number which corresponds to each horizontal scanning line by counting the signal p, so that the counter output 103 is developed as an output to the timing generator circuit 101. The timing generator circuit 101 develops the signal m as an output, and this signal m becomes "1" only during the period of time of 29/160H from 5/160H in front of the rise time of the signal k. The period of time of 29/160H is used for level-expansion, which is short in comparison with the period of time of 33/160H for level-compression as shown in FIG. 16.

(2) Signals generated at the time of level-expansion;

The signal n is developed by the timing generator circuit 101 as an output to the AND gate circuit 105 using output of the line counter 103. This signal n becomes "1" during 28-239L. This signal rises or falls at the rise time of the signal k. During the period of time in which the signal n is other than "1", the horizontal synchronizing signal is not level-compressed. In addition, the signal p denotes the key signal for descrambling as developed from the shift register circuit 97 by "1" or "0". In the case of "1", level-expansion is effected but, in the case of "0", it is not effected. This signal p is shifted by the signal l which is developed as an output for every 32H from the timing generator circuit 101. For example, a signal of 8 bits such as "110 10011" is developed as a one bit output (for every 32H), and the signal p is maintained as a stable output during the periods of time of 32H.

(3) Level-expansion (descrambling) of the horizontal synchronizing signal;

The signals m, n, p are supplied as inputs to the AND gate circuit 105 as mentioned above. When all the signals m, n, p are "1", the AND gate circuit 105 develops the "1" signal to the switching amplifier circuit 84, so as to enhance the amplification degree of the switching amplifier circuit 84. The period of time in which this switching amplifier circuit 84 is actuated is only the period of time of 29/160H in which the signal m is "1". This period of time is in the horizontal fly-back interval. The level of the horizontal synchronizing signal which was level-compressed is amplified so that level-expansion is effected up to the usual height, so that it becomes possible for the horizontal synchronizing signal to be separated in the television receiver 11. The central part of the upper stage in FIG. 20 denotes the horizontal fly-back interval which is level-compressed, while the central part at the lower stage denotes the horizontal fly-back interval as returned to the original state. As shown in the central part of the lower stage of FIG. 20, there are formed narrow valleys of respectively 2/160H on both sides of the horizontal fly-back interval in which the level-expansion is not effected. However, since these are located on the white level side, no influence is exerted upon the separation of the horizontal synchronizing signal. In addition, no unfavourable influence is exerted upon the picture on the screen. When the signal p is "0", the AND gate circuit 105 does not develop a signal as an output to the switching amplifier circuit 84. However, when this signal p is "0", level-compression was not effected at the horizontal flyback interval in the encoder 30, so that it is possible for the horizontal synchronizing signal to be separated as it is in the television receiver 11.

By the series of operations described hereinabove, the key signal which is sent from the encoder 30 is used in the decoder 81, so as to descramble the video signal which is level-compressed in predetermined horizontal flyback intervals. Furthermore, the horizontal flyback interval as required is level-expanded, thereby restoring the video signal so as to be able to reproduce normal pictures using the television receiver 11.

There were typically explained the addition and removal of the data signal as well as the level-compression and level-expansion of the video signals in FIGS. 15, 16 and 17 as stated before. The video signals in these drawings are different from the waveform which is modulated by the carrier in the embodiment and there is shown only the timing thereof. Therefore, in fact, the carrier is contained in each video signal as shown in FIG. 21. FIG. 21(a) shows the waveform of the IF input signal which is not processed, FIG. 21(b) shows the waveform which is level-compressed in the horizontal flyback interval and FIG. 21(c) shows the waveform which is level-expanded in the horizontal flyback interval. There is also shown the time comparison in these drawings. In addition, FIG. 22(a) shows the waveform in which the data signal is added to the horizontal synchronizing signal by the encoder 30, FIG. 22(b) is the wave form in which the data signal is removed in the trap circuit 85 of the decoder 81 and FIG. 22(c) shows the waveform of the timing with which the trap circuit 85 is actuated. The time comparison among these drawings is also indicated.

With the device constructed as stated hereinabove, there are brought about the following effects.

(a) Since it is possible to send out a plurality of key signals for descrambling for use in the following frames, there will be no case where the wrong key signal is used because of data error and the like.

(b) Even if a key signal is temporarily not transmitted, the plurality of key signals which have already been sent out are in turn used so as to make it possible to maintain the descrambling function. As a result, there occurs no case in which the television program is interrupted.

What is claimed is:

1. In a television broadcasting method wherein vertical synchronizing signals are developed as outputs at predetermined intervals, a plurality of horizontal synchronizing signals are developed between said vertical synchronizing signals and video signals are modulated and developed between said horizontal synchronizing signals, the improvement comprising:

selectively level compressing ones of said horizontal synchronizing signals so as to effect scrambling of each field of a TV picture signal; and generating a key signal for descrambling said each field of said TV picture signal, wherein a plurality of said key signals for descrambling which correspond to a plurality of fields including a particular field and subsequent fields are superposed, within said particular field, on a selected plurality of horizontal synchronizing signals between consecutive ones of said vertical synchronizing signals, wherein ones of said plurality of said key signals which are not available for descrambling the particular field in which they are superposed are available for descrambling subsequent fields.

2. A method according to claim 1, wherein said each frame of said TV picture signal is divided into a plurality of portions, and each portion is independently scrambled or left as it is in accordance with said each frame.

3. A method according to claim 2, including periodically generating random numbers for generating said key signals, and holding a plurality of said random numbers for said plurality of frames in a memory.

4. A method according to claim 3, including processing said random numbers through shift register means to control performance of said level compressing step 5. A method according to claim 3, including checking, at a decoder portion, the content of said key signals derived from a portion of said TV picture signal not subjected to level compression.

6. A method according to claim 5, including decoding said scrambled TV picture signal using said derived key signals as indicators for signal portions to be level expanded.

7. A method according to claim 1, wherein said key signals are superposed on at least 10 horizontal synchronizing signals following said vertical synchronizing signals and include information for decoding said plurality of fields of said TV picture signal.

8. A method according to claim 1, wherein said plurality of horizontal sychronizing signals include a flyback signal indicative of a horizontal flyback interval, said method including the steps of level-compressing said flyback signal before it is broadcast, and level-expanding said flyback signal after it is received.

9. A method according to claim 1, including the steps of demodulating said plurality of key signals in series, checking the demodulated key signals for accuracy, and outputting said demodulated key signals in parallel to a memory if they are accurate.

10. A method according to claim 9, including the step of, when said demodulated key signals are not accurate, shifting contents of said memory so as to output previously stored descramblingg information corresponding to one of said plurality of fields being descrambled at the time.

11. A method according to claim 1, wherein a number of said plurality of fields is five.

* * * * *